(12) United States Patent
Sun et al.

(10) Patent No.: US 11,595,952 B2
(45) Date of Patent: Feb. 28, 2023

(54) APERIODIC CHANNEL STATE INFORMATION SHARING ACROSS USER EQUIPMENT

(71) Applicant: QUALCOMM Incorporated, San Diego, CA (US)

(72) Inventors: Jing Sun, San Diego, CA (US); Xiaoxia Zhang, San Diego, CA (US); Srinivas Yerramalli, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/385,897

(22) Filed: Apr. 16, 2019

(65) Prior Publication Data

US 2019/0335427 A1 Oct. 31, 2019

Related U.S. Application Data

(60) Provisional application No. 62/663,913, filed on Apr. 27, 2018.

(51) Int. Cl.
*H04W 72/04* (2023.01)
*H04L 5/00* (2006.01)

(52) U.S. Cl.
CPC ......... *H04W 72/042* (2013.01); *H04L 5/0048* (2013.01); *H04W 72/0413* (2013.01)

(58) Field of Classification Search
None
See application file for complete search history.

(56) References Cited

U.S. PATENT DOCUMENTS

2015/0244444 A1* 8/2015 Mazzarese ........... H04B 7/0626
370/252
2016/0112892 A1 4/2016 Damnjanovic et al.
(Continued)

FOREIGN PATENT DOCUMENTS

KR 20170020270 A 2/2017
WO WO-2015176211 A1 11/2015
(Continued)

OTHER PUBLICATIONS

Samsung:"Triggered UCI Transmissions," 3GPP Draft; R1-1717169 Triggered UCI, 3rd Generation Partnership Project, Oct. 8, 2017, (Year: 2017).*

(Continued)

*Primary Examiner* — Christopher T Wyllie
(74) *Attorney, Agent, or Firm* — Holland & Hart LLP

(57) ABSTRACT

Methods, systems, and devices for wireless communications are described. A base station may transmit a first downlink control information block over a group physical downlink control channel (PDCCH), wherein the first downlink control information block identifies a plurality of user equipment (UEs) for performing aperiodic channel state information (CSI) measurements and an indication of CSI reference signal resources for a CSI reference signal. The base station may transmit the CSI reference signal on the indicated CSI reference signal resources. The UE may perform, in response to receiving the group PDCCH, an aperiodic CSI measurement of the CSI reference signal on the indicated CSI reference signal resources.

28 Claims, 17 Drawing Sheets

(56) References Cited

U.S. PATENT DOCUMENTS

| | | | |
|---|---|---|---|
| 2016/0344526 A1 | 11/2016 | Fan et al. | |
| 2018/0007673 A1* | 1/2018 | Fwu | H04W 4/70 |
| 2018/0241523 A1 | 8/2018 | Noh et al. | |
| 2019/0141693 A1* | 5/2019 | Guo | H04W 72/042 |
| 2019/0379503 A1* | 12/2019 | Kang | H04W 72/042 |
| 2020/0052804 A1* | 2/2020 | Hao | H04B 17/364 |
| 2020/0059967 A1* | 2/2020 | Kim | H04L 1/0026 |
| 2020/0084794 A1* | 3/2020 | Zhang | H04W 24/10 |

FOREIGN PATENT DOCUMENTS

| | | | | |
|---|---|---|---|---|
| WO | WO 2017/197642 | * | 11/2017 | H04W 72/04 |
| WO | WO-2017197642 A1 | | 11/2017 | |
| WO | WO 2018/006311 | * | 1/2018 | H04B 7/06 |
| WO | WO-2018006311 A | | 1/2018 | |
| WO | WO-2018006311 A1 | | 1/2018 | |
| WO | WO-2018228523 A1 | | 12/2018 | |

OTHER PUBLICATIONS

International Search Report and Written Opinion—PCT/US2019/027969—ISA/EPO—dated Jul. 23, 2019.

Samsung: "Triggered UCI Transmissions", 3GPP Draft; R1-1717679 Triggered UCI, 3rd Generation Partnership Project (3GPP), Mobile Competence Centre ; 650, Route Des Lucioles ; F-06921 Sophia-Antipolis Cedex; France, vol. RAN WG1, No. Prague, Czech Republic; Oct. 9, 2017-Oct. 13, 2017, Oct. 8, 2017 (Oct. 8, 2017), XP051340864, 3 Pages, Retrieved from the Internet: URL:http://www.3gpp.org/ftp/Meetings_3GPP_SYNC/RAN1/Docs/ [retrieved on Oct. 8, 2017].

Ericsson., et al., "On the Use of Aperiodic and Periodic CSI Feedback and the Impact on Periodic CSI Dropping", 3GPP TSG-RAN WG1 #68bis, R1-121010, Jeju, Republic of Korea, Mar. 26-30, 2012, 7 Pages.

ZTE: "Correction to Aperiodic CSI Reporting with One Configured CSI Process", 3GPP TSG RAN WG1 Meeting #72, R1-130628, St Julian's, Malta, Jan. 28-Feb. 1, 2013, pp. 1-4.

\* cited by examiner

APERIODIC CHANNEL STATE INFORMATION SHARING ACROSS USER EQUIPMENT

CROSS REFERENCES

The present Application for Patent claims the benefit of U.S. Provisional Patent Application No. 62/663,913 by SUN, et al., entitled "Aperiodic Channel State Information Sharing Across User Equipment," filed Apr. 27, 2018, assigned to the assignee hereof, and expressly incorporated herein.

BACKGROUND

The following relates generally to wireless communications, and more specifically to aperiodic channel state information reference signal (CSI-RS) sharing across user equipment (UEs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Certain wireless communication systems may use reference signals (RSs) for channel performance measurement and reporting. The RSs may be transmitted by the base station and/or by the UE according to a periodic schedule or as needed, e.g., aperiodic. Some wireless communication systems may operate in a shared or unlicensed radio frequency spectrum band and utilize a listen-before-talk (LBT)-based channel access procedure. This environment, and others, may be suitable for the UEs to share aperiodic CSI-RS(s), e.g., it may be beneficial to support reuse of the aperiodic CSI-RS(s) across multiple UEs. However, existing CSI-RS techniques are not optimized for aperiodic CSI-RS reuse.

SUMMARY

The described techniques relate to improved methods, systems, devices, and apparatuses that support aperiodic channel state information reference signal (CSI-RS) sharing across user equipment (UEs). Generally, the described techniques provide separation between the aperiodic CSI-RS resource indication and the aperiodic CSI-RS measurement report trigger. Broadly, a base station may use a group control signal to indicate the resources for the aperiodic CSI-RS and then use a grant to a UE to trigger the aperiodic CSI-RS measurement reporting. For example, the base station may transmit a first downlink control information block to a group of UEs. The first downlink control information block may be transmitted in a group based physical downlink control channel (PDCCH), such as a group common PDCCH (GC-PDCCH). The group PDCCH may identify the UEs in the group that are to perform aperiodic CSI measurements. The group PDCCH may also carry or otherwise provides an indication of the resources for one or more instances of the aperiodic CSI-RS(s). UEs within the group may receive the first downlink control information block and perform the aperiodic CSI measurement of the aperiodic CSI-RS. One or more of the UEs in the group may transmit the aperiodic CSI measurement report to the base station. In some aspects, the aperiodic CSI measurements may be reported to the base station in response to a triggering event, such as a second downlink control information block (e.g., a grant) received by the UE. The UE may receive the grant and piggyback the aperiodic CSI measurement report using a portion of the resources indicated in the grant. This may support aperiodic CSI-RS reuse between UEs in the group without the base station having to configure and transmit individual messages to the UEs to identify the CSI-RS resource(s).

A method of wireless communication at a UE is described. The method may include receiving first downlink control information block over a group PDCCH, where the first downlink control information block identifies a set of UEs for performing aperiodic CSI measurements and an indication of CSI reference signal resources for a CSI reference signal, and performing, in response to receiving the group PDCCH, an aperiodic CSI measurement of the CSI reference signal on the indicated CSI reference signal resources.

An apparatus for wireless communication at a UE is described. The apparatus may include a processor, memory in electronic communication with the processor, and instructions stored in the memory. The instructions may be executable by the processor to cause the apparatus to receive first downlink control information block over a group PDCCH, where the first downlink control information block identifies a set of UEs for performing aperiodic CSI measurements and an indication of CSI reference signal resources for a CSI reference signal, and perform, in response to receiving the group PDCCH, an aperiodic CSI measurement of the CSI reference signal on the indicated CSI reference signal resources.

Another apparatus for wireless communication at a UE is described. The apparatus may include means for receiving first downlink control information block over a group PDCCH, where the first downlink control information block identifies a set of UEs for performing aperiodic CSI measurements and an indication of CSI reference signal resources for a CSI reference signal, and performing, in response to receiving the group PDCCH, an aperiodic CSI measurement of the CSI reference signal on the indicated CSI reference signal resources.

A non-transitory computer-readable medium storing code for wireless communication at a UE is described. The code may include instructions executable by a processor to receive first downlink control information block over a group PDCCH, where the first downlink control information block identifies a set of UEs for performing aperiodic CSI measurements and an indication of CSI reference signal resources for a CSI reference signal, and perform, in response to receiving the group PDCCH, an aperiodic CSI measurement of the CSI reference signal on the indicated CSI reference signal resources.

Some examples of the method, apparatuses, and non-transitory computer-readable medium described herein may further include operations, features, means, or instructions for receiving a second downlink control information block including a grant to the UE, and transmitting the aperiodic CSI measurement of the CSI reference signal based at least in part on the grant.

In some examples of the method, apparatuses, and non-transitory computer-readable medium described herein, the grant includes an uplink grant and the aperiodic CSI measurement may be transmitted over a physical uplink shared channel (PUSCH).

In some examples of the method, apparatuses, and non-transitory computer-readable medium described herein, the grant includes a downlink grant and the aperiodic CSI measurement may be transmitted over a physical uplink control channel (PUCCH).

Some examples of the method, apparatuses, and non-transitory computer-readable medium described herein may further include operations, features, means, or instructions for receiving the second downlink control information block occurs later in time than receiving the CSI reference signal.

Some examples of the method, apparatuses, and non-transitory computer-readable medium described herein may further include operations, features, means, or instructions for receiving a group PDCCH configuration information for monitoring for the CSI reference signal and monitoring for the CSI reference signal based on the group PDCCH configuration information.

Some examples of the method, apparatuses, and non-transitory computer-readable medium described herein may further include operations, features, means, or instructions for identifying, based on the first downlink control information block, a timing offset parameter, where the timing offset parameter identifies a timing for transmitting the CSI reference signal with respect to the timing of transmitting the group PDCCH and monitoring for the CSI reference signal based on the timing offset parameter.

Some examples of the method, apparatuses, and non-transitory computer-readable medium described herein may further include operations, features, means, or instructions for transmitting an autonomous uplink (AUL) transmission that includes an aperiodic CSI measurement of the CSI reference signal.

In some examples of the method, apparatuses, and non-transitory computer-readable medium described herein, the first downlink control information block indicates CSI reference signal resources for multiple instances of the CSI reference signal.

In some examples of the method, apparatuses, and non-transitory computer-readable medium described herein, the first downlink control information block includes at least one of a timing parameter, or a location parameter, or a combination thereof, for the CSI reference signal resources.

A method of wireless communication at a base station is described. The method may include transmitting a first downlink control information block over a group PDCCH, where the first downlink control information block identifies a set of UEs for performing aperiodic CSI measurements and an indication of CSI reference signal resources for a CSI reference signal, and transmitting the CSI reference signal on the indicated CSI reference signal resources.

An apparatus for wireless communication at a base station is described. The apparatus may include a processor, memory in electronic communication with the processor, and instructions stored in the memory. The instructions may be executable by the processor to cause the apparatus to transmit a first downlink control information block over a group PDCCH, where the first downlink control information block identifies a set of UEs for performing aperiodic CSI measurements and an indication of CSI reference signal resources for a CSI reference signal, and transmit the CSI reference signal on the indicated CSI reference signal resources.

Another apparatus for wireless communication at a base station is described. The apparatus may include means for transmitting a first downlink control information block over a group PDCCH, where the first downlink control information block identifies a set of UEs for performing aperiodic CSI measurements and an indication of CSI reference signal resources for a CSI reference signal, and transmitting the CSI reference signal on the indicated CSI reference signal resources.

A non-transitory computer-readable medium storing code for wireless communication at a base station is described. The code may include instructions executable by a processor to transmit a first downlink control information block over a group PDCCH, where the first downlink control information block identifies a set of UEs for performing aperiodic CSI measurements and an indication of CSI reference signal resources for a CSI reference signal, and transmit the CSI reference signal on the indicated CSI reference signal resources.

Some examples of the method, apparatuses, and non-transitory computer-readable medium described herein may further include operations, features, means, or instructions for transmitting, to the UE, a second downlink control information block including a grant of resources to the UE, where receiving the aperiodic CSI measurement from the UE may be based on the grant, and receiving an aperiodic CSI measurement report of the CSI reference signal from the UE based at least in part on the grant.

In some examples of the method, apparatuses, and non-transitory computer-readable medium described herein, the grant includes an uplink grant and the aperiodic CSI measurement may be received over a PUSCH.

In some examples of the method, apparatuses, and non-transitory computer-readable medium described herein, the grant includes a downlink grant and the aperiodic CSI measurement may be received over a PUCCH.

Some examples of the method, apparatuses, and non-transitory computer-readable medium described herein may further include operations, features, means, or instructions for transmitting the second downlink control information block occurs later in time than transmitting the CSI reference signal.

Some examples of the method, apparatuses, and non-transitory computer-readable medium described herein may further include operations, features, means, or instructions for transmitting, to each UE of the set of UEs, a second downlink control information block comprising a UE-specific grant of resources to the UE, and receiving a set of aperiodic CSI measurements of the CSI reference signal from the set of UEs based on the respective UE-specific grant.

Some examples of the method, apparatuses, and non-transitory computer-readable medium described herein may further include operations, features, means, or instructions for transmitting to the UE a group PDCCH configuration including information for monitoring the group PDCCH.

In some examples of the method, apparatuses, and non-transitory computer-readable medium described herein, the first downlink control information block indicates CSI reference signal resources for a multiple instances of the CSI reference signal.

Some examples of the method, apparatuses, and non-transitory computer-readable medium described herein may further include operations, features, means, or instructions for receiving an AUL transmission from the UE, where the AUL transmission includes an aperiodic CSI measurement of the CSI reference signal.

Some examples of the method, apparatuses, and non-transitory computer-readable medium described herein may further include operations, features, means, or instructions for transmitting a third downlink control information block to a second UE of the set of UEs, where the third downlink control information block includes a grant for the second UE and receiving a second aperiodic CSI measurement of the CSI reference signal from the second UE based on the grant.

In some examples of the method, apparatuses, and non-transitory computer-readable medium described herein, the third downlink control information block may be transmitted in conjunction with the first downlink control information block.

In some examples of the method, apparatuses, and non-transitory computer-readable medium described herein, the first downlink control information block includes a timing offset parameter, where the timing offset parameter identifies a timing for transmitting the CSI reference signal with respect to the timing of transmitting the group PDCCH.

In some examples of the method, apparatuses, and non-transitory computer-readable medium described herein, the first downlink control information block includes at least one of a timing parameter, or a location parameter, or a combination thereof, for the CSI reference signal resources.

In some examples of the method, apparatuses, and non-transitory computer-readable medium described herein, the first downlink control information block identifies UEs of the set of UEs that may be to perform the aperiodic CSI measurements.

DETAILED DESCRIPTION

Figure 1:
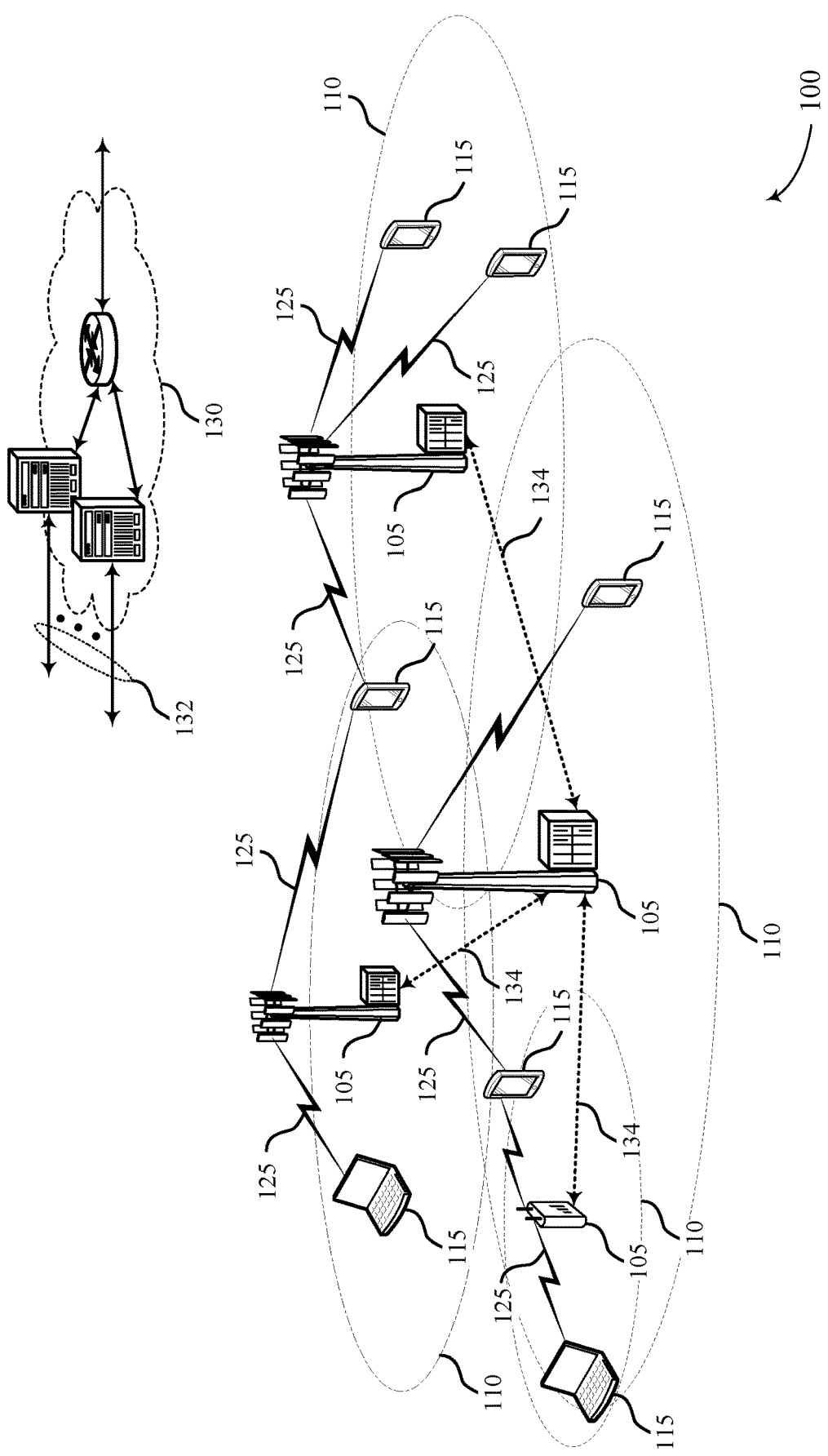
FIG. 1 illustrates an example of a system for wireless communications that supports aperiodic channel state information reference signal (CSI-RS) sharing across user equipment (UEs) in accordance with aspects of the present disclosure.

Wireless communication systems typically rely on reference signals (RSs) to monitor the health and performance of the wireless channel. The RSs may be transmitted by a base station and/or a user equipment (UE) according to a periodic schedule or aperiodically. As one example, a base station may transmit one or more instances of a channel state information reference signal (CSI-RS) on a channel for UE(s) to perform channel measurement and reporting. When the CSI-RSs are transmitted on a periodic schedule, the base station and UE may be configured (e.g., when configuring the periodic schedule) with the CSI-RS resources as well as the resources used for the CSI measurement reporting. When the CSI-RSs are transmitted on an aperiodic schedule, the base station typically must provide an indication to the UE of the aperiodic CSI-RS resource as well as the resources to be used for the CSI reporting by the UE. Conventionally, the base station uses a grant to indicate the CSI-RS configuration (e.g., the pattern of CSI-RS transmissions, timing information, and the like) as well as an indication of the resources to be used by the UE for the CSI measurement reporting. In some aspects, the CSI measurement and reporting resources may be piggybacked onto the resources associated with the grant. While this technique may be suitable for an individual UE to perform CSI-RS measurement and reporting, it does not support CSI-RS reuse amongst multiple UEs.

Aspects of the disclosure are initially described in the context of a wireless communications system. Generally, the described techniques support aperiodic CSI-RS reuse amongst a group of UEs where the aperiodic CSI-RS resources can be indicated to the group of UEs separately from, and without automatically triggering, CSI-RS measurement reporting. For example, a base station may transmit downlink control information (e.g., a first downlink control information block) over a group control signal. In some examples, the group control signal may be a group physical downlink control channel (PDCCH), such as a group common PDCCH (GC-PDCCH). In some aspects, the first downlink control information block may identify the UEs in the group of UEs, e.g., may identify which UEs are to perform aperiodic CSI measurement, as well as indicate the resources for the CSI-RS(s). The base station may then transmit the aperiodic CSI-RS(s) on the resources indicated in the first downlink control information block. The UEs in the group of UEs may receive the first downlink control information block, identify the resources for the aperiodic CSI-RS(s) and perform the aperiodic CSI measurements accordingly. In some aspects, one or more of the UEs in the group of UEs may transmit an aperiodic CSI measurement of the CSI-RS to the base station. In some aspects, this CSI measurement report may be triggered by the base station (e.g., separately from the first downlink control information block). For example, the base station may transmit additional downlink control information (e.g., a second downlink control information block) to individual UEs within the group of UEs to trigger the CSI measurement reporting. Thus, aspects of the described techniques may separate the indication of the CSI-RS resources and the triggering of the aperiodic CSI measurement reporting to support CSI-RS reuse amongst UEs in the group of UEs.

Aspects of the disclosure are further illustrated by and described with reference to apparatus diagrams, system diagrams, and flowcharts that relate to aperiodic CSI-RS sharing across UEs.

FIG. 1 illustrates an example of a wireless communications system 100 that supports aperiodic CSI-RS sharing across UEs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=third 0,720,000 seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may transmit a first downlink control information block over a group PDCCH, wherein the first downlink control information block identifies a plurality of UEs 115 for performing aperiodic CSI measurements and an indication of CSI reference signal resources for a CSI reference signal. The base station 105 may transmit the CSI reference signal on the indicated CSI reference signal resources.

A UE 115 may receive a first downlink control information block over a group PDCCH, wherein the first downlink control information block identifies a plurality of UEs 115 for performing aperiodic CSI measurements and an indication of CSI reference signal resources for a CSI reference signal. The UE 115 may perform, in response to receiving the group PDCCH, an aperiodic CSI measurement of the CSI reference signal on the indicated CSI reference signal resources.

Figure 2:
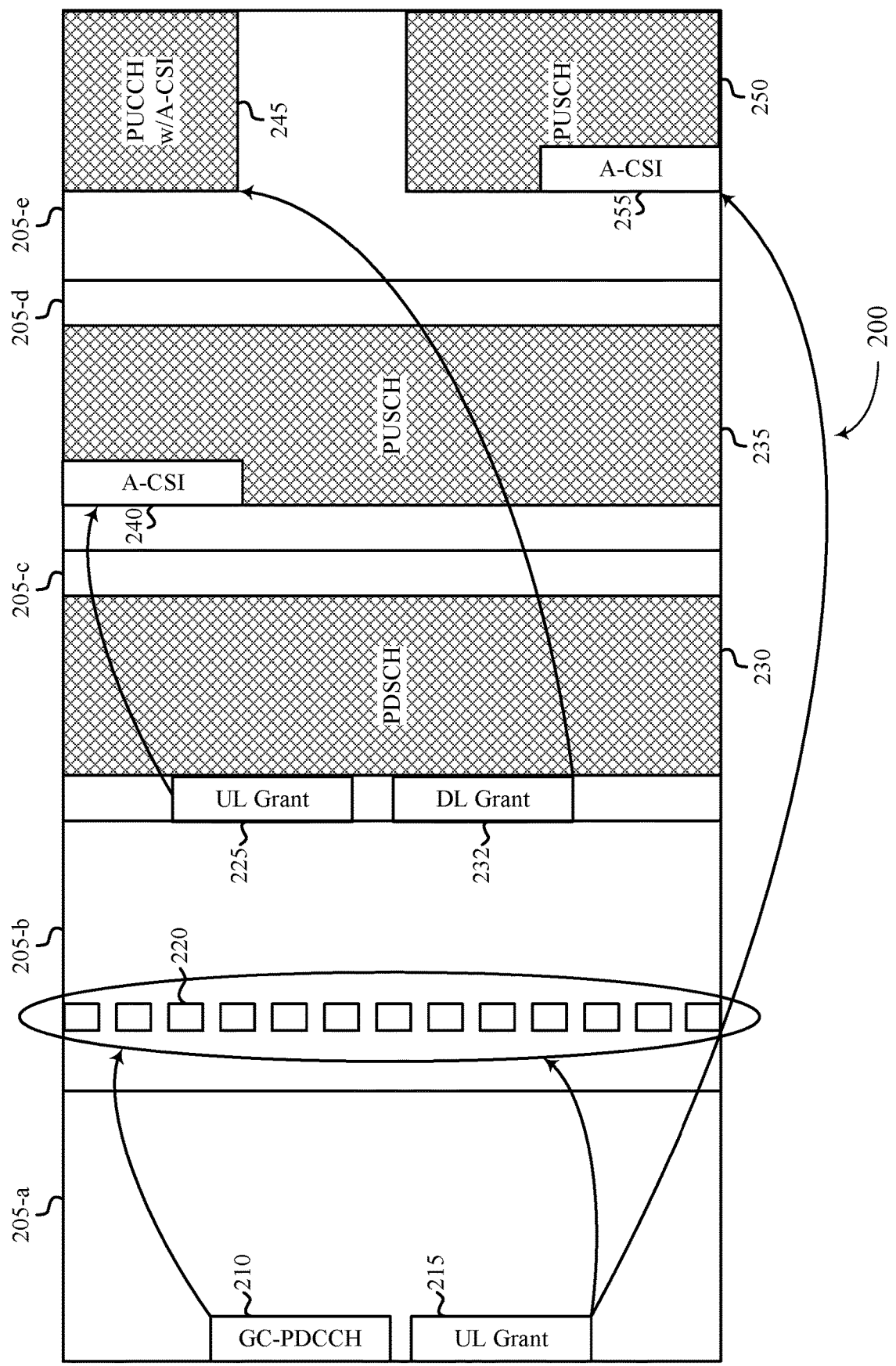
FIG. 2 illustrates an example of a CSI configuration that supports aperiodic CSI-RS sharing across UEs in accordance with aspects of the present disclosure.

FIG. 2 illustrates an example of a CSI configuration 200 that supports aperiodic CSI-RS sharing across UEs in accordance with aspects of the present disclosure. In some examples, CSI configuration 200 may implement aspects of wireless communication system 100. Aspects of CSI configuration 200 may be implemented by UE and/or a base station, which may be examples of the corresponding devices described herein. Generally, CSI configuration 200 illustrates one example of how CSI-RS(s) can be shared amongst multiple UEs in a wireless communication systems.

CSI configuration 200 generally includes one or more slots 205, with five slots 205 being shown by way of example only. It is to be understood that the described techniques are not limited to slots 205 and, instead, can be utilized in a partial slot, a mini slot, a subframe, a TTI, a TxOP, or any other time periods used for performing wireless communications. Moreover, more or fewer slots 205 may be utilized in accordance with the described techniques.

During the first slot 205-a, the base station may transmit an uplink grant 215 to a particular UE. Generally the uplink grant 215 may include bits and/or a field that indicates which configuration is being used for communicating CSI-RS 220 (with only one CSI-RS 220 being labeled for ease of reference), with the CSI-RS 220 to be used by that UE to perform channel measurements, e.g., which CSI-RS 220 to be used for channel estimation, for interference estimation, and the like. In some aspects, the uplink grant 215 may also provide an indication of the resources for PUSCH 250 in which the UE can use to transmit the aperiodic CSI measurement report 255. While this technique may be suitable for an individual UE, it may be cumbersome and involve excessive overhead when the CSI-RS 220 is to be shared amongst a plurality of UEs.

Accordingly, during a first slot 205-a the base station may transmit a group PDCCH 210 to a group of UEs. In some aspects, the group PDCCH 210 may be a GC-PDCCH. The group PDCCH 210 may include a first downlink control information block that identifies UEs within the group (e.g., some or all of the UEs within the group) that are to perform aperiodic CSI measurements. For example, the base station may determine which UEs within the group are to perform the aperiodic CSI measurements based on monitored channel conditions between each UE, based on a periodic schedule, based on an as-needed basis, and the like. In some aspects, the first downlink control information block may also identify or otherwise provide an indication of resources for CSI-RS 220. In some aspects, the resources indicated in the first downlink control information block for the CSI-RS 220 may include resources for a plurality of instances of CSI-RS 220. In some aspects, the resources indicated in the first downlink control information block may generally provide an indication of the pattern, timing, location, and the like, for the CSI-RS 220. In the example CSI configuration 200, the indicated resources for the CSI-RS 220 occur during the second slot 205-b.

In some aspects, one or more of the CSI-RS 220 may be or otherwise associated with discovery reference signals (DRSs). For example, the CSI-RS 220 may include one or more traditional CSI-RSs that are multiplexed in the time-domain, frequency domain, and the like, with one or more DRSs. The UE may utilize the DRSs as part of a discovery process in relation to the base station.

In some aspects, the first downlink control information block may include timing offset parameter information. This may provide an indication of the timing difference (in terms of absolute or relative time, number of slots 205, etc.) between transmitting the group PDCCH 210 and the CSI-RS 220. The base station may transmit the CSI-RS 220 during the second slot 205-b and over the resources indicted in the first downlink control information block.

In some aspects, UEs receiving the group PDCCH 210 may decode the first downlink control information block and determine that they are identified for performing aperiodic CSI measurements. The UEs may identify the resources of the CSI-RS 220 from the first downlink control information. Accordingly, these UEs may perform the aperiodic CSI measurement of the CSI-RS 220, e.g., may measure various aspects of the channel performance using the indicated CSI-RS 220 resources. In some aspects, the aperiodic CSI measurements may include a signal-to-noise ratio (SNR) measurement, a signal-to-noise-plus-interference ratio (SINR) measurement, a throughput rate measurement, and reference signal received power (RSRP) measurement, a reference signal received quality (RSRQ) measurement, and the like. However, the UEs performing aperiodic CSI measurement may not automatically be triggered to provide an aperiodic CSI measurement report based on the group PDCCH 210. The base station may communicate downlink information to one or more UEs during the third slot 205-c in PDSCH 230.

To trigger the aperiodic CSI measurement reporting from the UEs, the base station may transmit a second downlink control information block to each UE that comprises a grant for the UE. The UE may transmit the aperiodic CSI measurement report based on the grant. For example and during a third slot 205-c, the base station may transmit an uplink grant 225 to a UE that identifies resources for a PUSCH 235 that occurs during the fourth slot 205-d. The UE may transmit the aperiodic CSI measurement 240 of the CSI-RS 220 during the PUSCH 235, e.g., the UE may piggyback the aperiodic CSI measurement 240 in the PUSCH 235 resources.

As another example and during the third slot 205-c, the base station may transmit a downlink grant 232 to a UE that identifies resources for the PUCCH 245 occurring during the fifth slot 205-e. Again, this UE may respond to the downlink grant 232 by transmitting the aperiodic CSI measurement report piggybacking on the PUCCH 245 resources.

It is to be understood that the timing between transmission of the first downlink control information block (e.g., the group PDCCH 210) and a trigger for the aperiodic CSI measurement reporting (e.g., the uplink grant 225 and/or the downlink grant 232) may be different than as shown in CSI configuration 200. In one example, the second downlink control information block may be transmitted later in time than the CSI-RS 220 (e.g., as is shown in CSI configuration 200). However, in other examples the second downlink control information block may be transmitted earlier in time than the CSI-RS 220. For example, the base station may transmit the group PDCCH 210 during a first slot 205-a, transmit the second downlink control information block during a second slot 205-b, with the CSI-RS 220 transmission and the PUSCH 250/PUCCH 245 occurring during subsequent slots 205, and so on.

In some aspects, an aperiodic CSI-RS (e.g., CSI-RS 220) may be shared by a group of UEs. Aspects of the described techniques provide a mechanism to support the sharing within the group of UEs. Generally, UEs may be configured with multiple aperiodic CSI-RS configurations. The described techniques may use a GC-PDCCH to trigger multiple UEs to monitor the aperiodic CSI-RS, but does not trigger the aperiodic CSI report. The UEs involved are configured to monitor the GC-PDCCH, e.g., based on a group PDCCH configuration signal. This information can also be used for rate matching purposes for other UEs and may include the transmission timing of the aperiodic CSI-RS (which may occur in different slots 205). In some aspects, the group PDCCH 210 may also include the location of the aperiodic CSI-RS 220 resources in case there is a need for the UE to dynamically locate the CSI-RS (e.g., in mini slots, partial slots, etc.)

In some aspects, the group PDCCH 210 may include identifying information in order for each UE to be able to determine whether it was triggered to perform the aperiodic CSI measurement and, if so, which aperiodic CSI-RS 220 corresponds to the UE. In one example, this may include an CSI-RS resource identifier or resource configuration identifier being used. In some aspects, this may include multiple fields in the GC-PDCCH, if multiple aperiodic CSI-RS 220 can be configured (e.g., using different ports, time locations, etc.).

In some aspects, the aperiodic CSI measurement report can be separately triggered when the UE is addressed. For example, it can be separately triggered when there is downlink or uplink traffic for the UE. The trigger can be included in the downlink or uplink grants (e.g., uplink grant 225 and downlink grant 232). The aperiodic CSI measurement can be reported in PUCCH 245 (e.g., when triggered by downlink grant 232) or PUSCH 250 (e.g., when triggered by downlink grant 232).

In other examples (not shown), the aperiodic CSI measurement report can be included in an autonomous uplink (AUL) uplink control indicator (UCI), e.g., when there is an AUL transmission opportunity available for the reporting UE. The rate matching for the AUL transmission can be dynamically determined by the base station (e.g., in the situation where the UE misses the group PDCCH 210 that triggers the aperiodic CSI-RS measurement).

In some aspects, the described techniques are configured for a single cell and/or bandwidth part (BWP) implementation. However, in some aspects the described techniques may be implemented to multiple cells, multiple BWPs, multiple TRPs, and the like.

Figure 3:
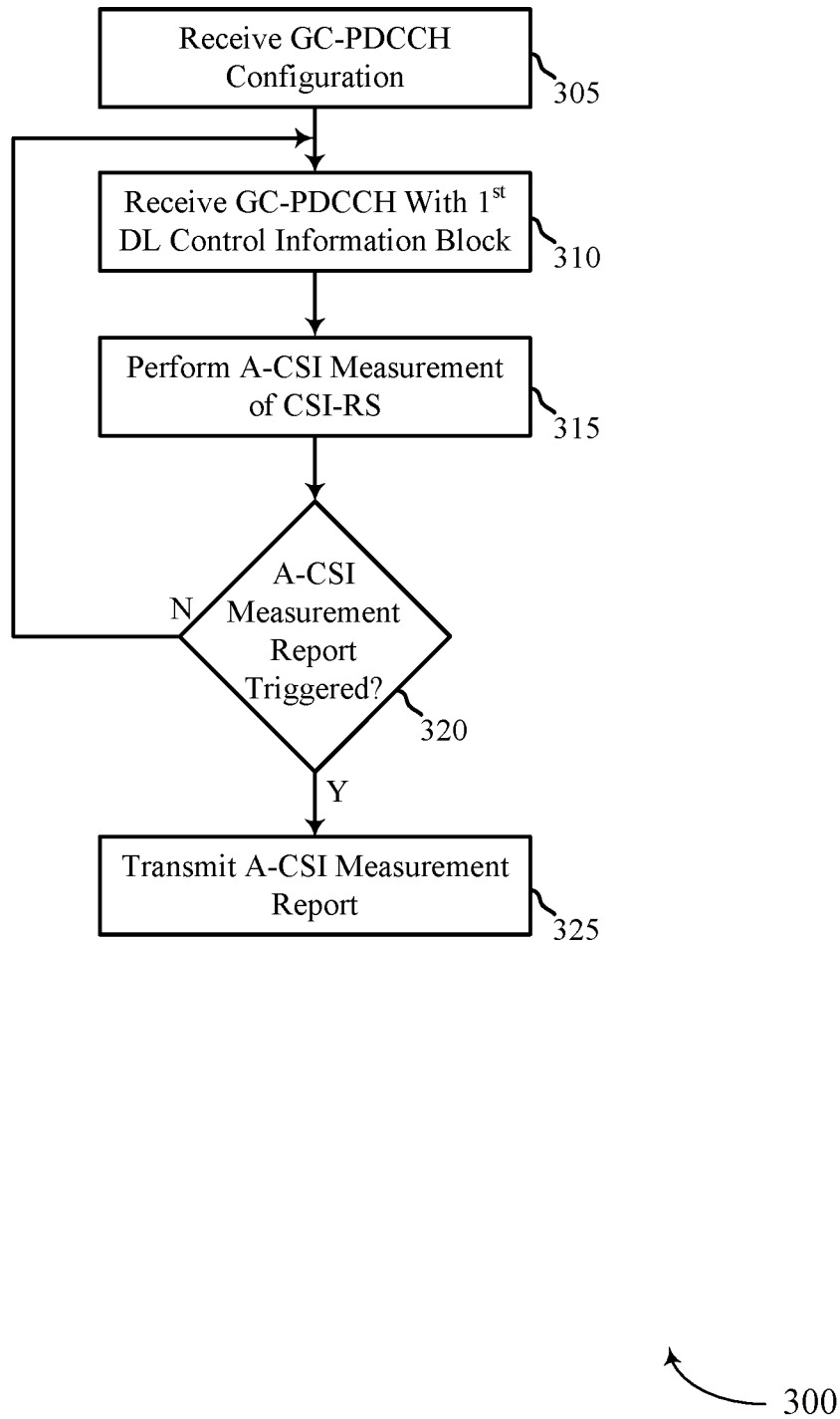
FIG. 3 illustrates an example of a method that supports aperiodic CSI-RS sharing across UEs in accordance with aspects of the present disclosure.

FIG. 3 illustrates an example of a method 300 that supports aperiodic CSI-RS sharing across UEs in accordance with aspects of the present disclosure. In some examples, method 300 may implement aspects of wireless communication system 100 and/or CSI configuration 200. Aspects of method 300 may be implemented by UE, which may be an example of the corresponding device described herein.

At 305, the UE may be configured with GC-PDCCH information. In some aspects, this may include the UE receiving the configuration information from a base station that identifies when and where the UE is to monitor for and receive the GC-PDCCH signal, e.g., which time-frequency resources the GC-PDCCH signal uses during a mini slot, a slot, and the like. Accordingly, the UE may know when and where to monitor for the group PDCCH signal (e.g., the GC-PDCCH signal).

At 310, the UE may receive a GC-PDCCH that carries or otherwise conveys an indication of a first downlink control information block. In some aspects, the first downlink control information block identifies the UE(s) for performing aperiodic CSI measurements and also provides an indication of aperiodic CSI-RS resources. In some aspects, the first downlink control information block may be received over the GC-PDCCH signal in one slot, and the indicated CSI-RS resources may occur in the same slot or in a later slot. The first downlink control information block may indicate a configuration for the CSI-RS resources (e.g., an index to a predetermined CSI-RS configuration), time resources for the CSI-RS, frequency resources for the CSI-RS, pattern information for the CSI-RS resources, timing offset information, for the CSI-RS, and the like. Generally, the first downlink control information block may include or otherwise convey sufficient information that allows the UE to determine when and where to monitor for and receive one or more instances of the CSI-RS.

At 315, the UE may perform the aperiodic CSI measurement of the CSI-RS, e.g., based on the first downlink control information block received over the GC-PDCCH signal. In some aspects, this measurement may be performed on a single CSI-RS or may be performed on the plurality of CSI-RSs, with the plurality of CSI-RSS occurring during one or more slots. In some aspects, this may include the UE maintaining a current aperiodic CSI measurement of CSI-RSs over a predetermined time period. Accordingly, the UE may have a current aperiodic CSI measurement stored for the most recent CSI-RS. This may reduce the amount of time associated with the base station requesting and receiving updated channel performance information from the UE.

At 320, the UE may determine whether an aperiodic CSI measurement report has been triggered. If no trigger has been detected, the UE returns to 310 and continues to monitor for additional GC-PDCCH signals from the base station. In other examples where no trigger has been detected, the UE may return to 315 and continue to perform aperiodic CSI measurements of the CSI-RS. If the UE determines that an aperiodic CSI measurement report has been triggered, at 325 the UE transmits the aperiodic CSI measurement of the CSI-RS to the base station. In some aspects, the aperiodic CSI measurement may include or otherwise convey an indication of a SNR, SINR, RSRP, RSRQ, and the like, for the channel based on the CSI-RS.

In some aspects, the UE may determine that the aperiodic CSI measurement report has been triggered based on receiving a second downlink control information block from the base station that includes or otherwise conveys an indication of a grant for the UE (e.g., an uplink grant or downlink grant). The UE may transmit the aperiodic CSI measurement report of the CSI-RS based on the grant, e.g., may piggyback the aperiodic CSI measurement report using the resources indicated in the grant. The UE mat transmit the aperiodic CSI measurement report in a PUSCH (e.g., in response to an uplink grant) or in a PUCCH (e.g., in response to a downlink grant).

Thus, aspects of the described techniques provide an efficient mechanism for the base station to signal the indication of the CSI-RS resources to a group of UEs. The described techniques also provide a mechanism where the indication of the CSI-RS resources is separated from the trigger for the aperiodic CSI-RS measurement reporting from individual UEs.

Figure 4:
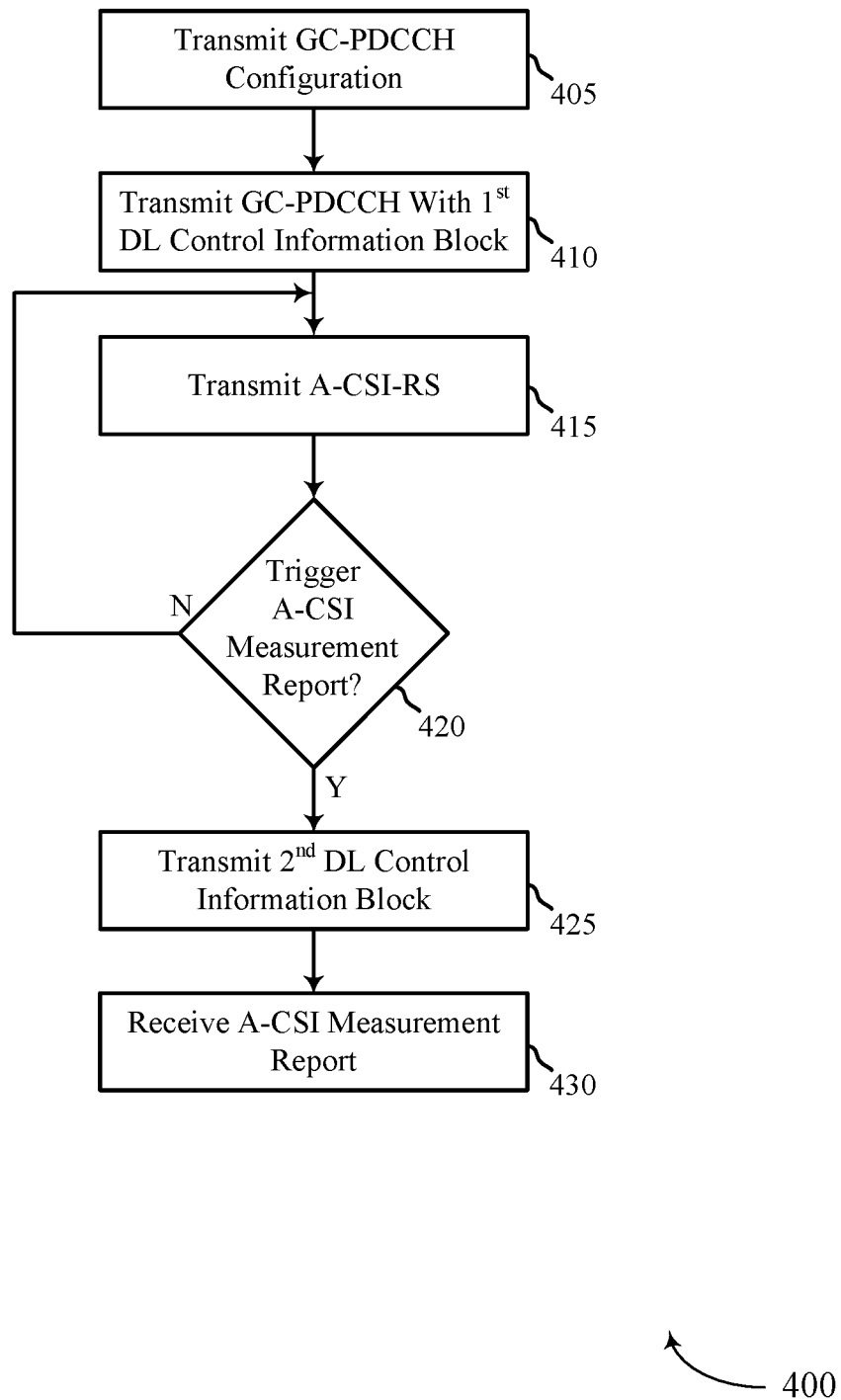
FIG. 4 illustrates an example of a method that supports aperiodic CSI-RS sharing across UEs in accordance with aspects of the present disclosure.

FIG. 4 illustrates an example of a method 400 that supports aperiodic CSI-RS sharing across UEs in accordance with aspects of the present disclosure. In some examples, method 400 may implement aspects of wireless communication system 100, CSI configuration 200, and/or method 300. Aspects of method 400 may be implement a by a base station, which may be an example of the corresponding device described herein.

At 405, the base station may transmit configuration information for a group PDCCH signal, such as a GC-PDCCH signal. In some aspects, the configuration information may include or otherwise provide an indication of time/frequency resources for the GC-PDCCH signal, e.g., may provide an indication of information for the UE to use to monitor for the group common PDCCH signal. In some aspects, the configuration information may also indicate that the UE is included (e.g., a group member) within a group of UEs. Accordingly, the UE may monitor for one or more group PDCCH signals based on the configuration information.

At 410, the base station may transmit a first downlink control information block over a GC-PDCCH signal. In some aspects, the first downlink control information block may include or otherwise convey an indication identifying one or more UEs within the group to perform aperiodic CSI-RS measurements, e.g., may identify which UEs within the group are to perform the aperiodic CSI measurements. In some aspects, the first downlink control information block may also include or otherwise convey an indication of resources for one or more instances of aperiodic CSI-RSs. For example, the indication of resources may include time, frequency, pattern, offset timing, and other information that may provide information usable by a UE to monitor and receive the aperiodic CSI-RS(s). In some aspects, the first downlink control information block may include a timing offset parameter that may provide an indication of the time difference (e.g., in terms of absolute or relative time, in terms of mini slots, slots, and the like) between the transmission of the GC-PDCCH signal and the subsequent CSI-RS(s). For example, the timing offset parameter may identify an absolute or relative time difference between the transmissions.

At 415, the base station may transmit the aperiodic CSI-RS(s) over the indicated resources. In some aspects, this may include transmitting a single aperiodic CSI-RS or multiple instances of the aperiodic CSI-RSs. In the example where multiple aperiodic CSI-RSs are transmitted, the base station may transmit the aperiodic CSI-RSs during a single slot or in multiple slots.

At 420, the base station may determine whether to trigger an aperiodic CSI measurement report from the UE, e.g., one or more UEs in the group of UEs. For example, the base station may determine that there is information to exchange between the UE and the base station and therefore an aperiodic CSI measurement report is needed. In other examples, the base station may determine that the most recent aperiodic CSI measurement report from that UE is no longer valid (e.g., has expired or occurred beyond a predefined time period) and therefore trigger an aperiodic CSI measurement report from the UE. If the base station determines not to trigger an aperiodic CSI measurement report from the UE, at 420 the base station returns to 415 and continues to transmit aperiodic CSI-RS(s) over the indicated resources.

If the base station determines to trigger an aperiodic CSI measurement report from a UE, at 425 the base station may transmit a second downlink control information block to the UE that includes a grant. At 430, the base station may receive the aperiodic CSI measurement report from the UE over the resources indicated in the grant.

In some aspects, this may include an uplink grant or downlink grant, where the UE may piggyback the aperiodic CSI measurement report using the resources indicated in the grant. As one example where the grant is an uplink grant, the UE may transmit the aperiodic CSI measurement over a PUSCH resource indicated in the grant. As another example where the grant is a downlink grant, the UE may transmit the aperiodic CSI measurement over a PUCCH resource that was indicated in the grant. As discussed previously, in some aspects the base station may receive the aperiodic CSI measurement during an AUL transmission opportunity. In some examples, the base station may receive multiple aperiodic CSI measurement reports from UEs, e.g., one or more reports from each UE identified in the first downlink control information block. The base station may use the information indicated in the aperiodic CSI measurement report to determine various communication parameters to use for wireless communications with the UE.

Figure 5:
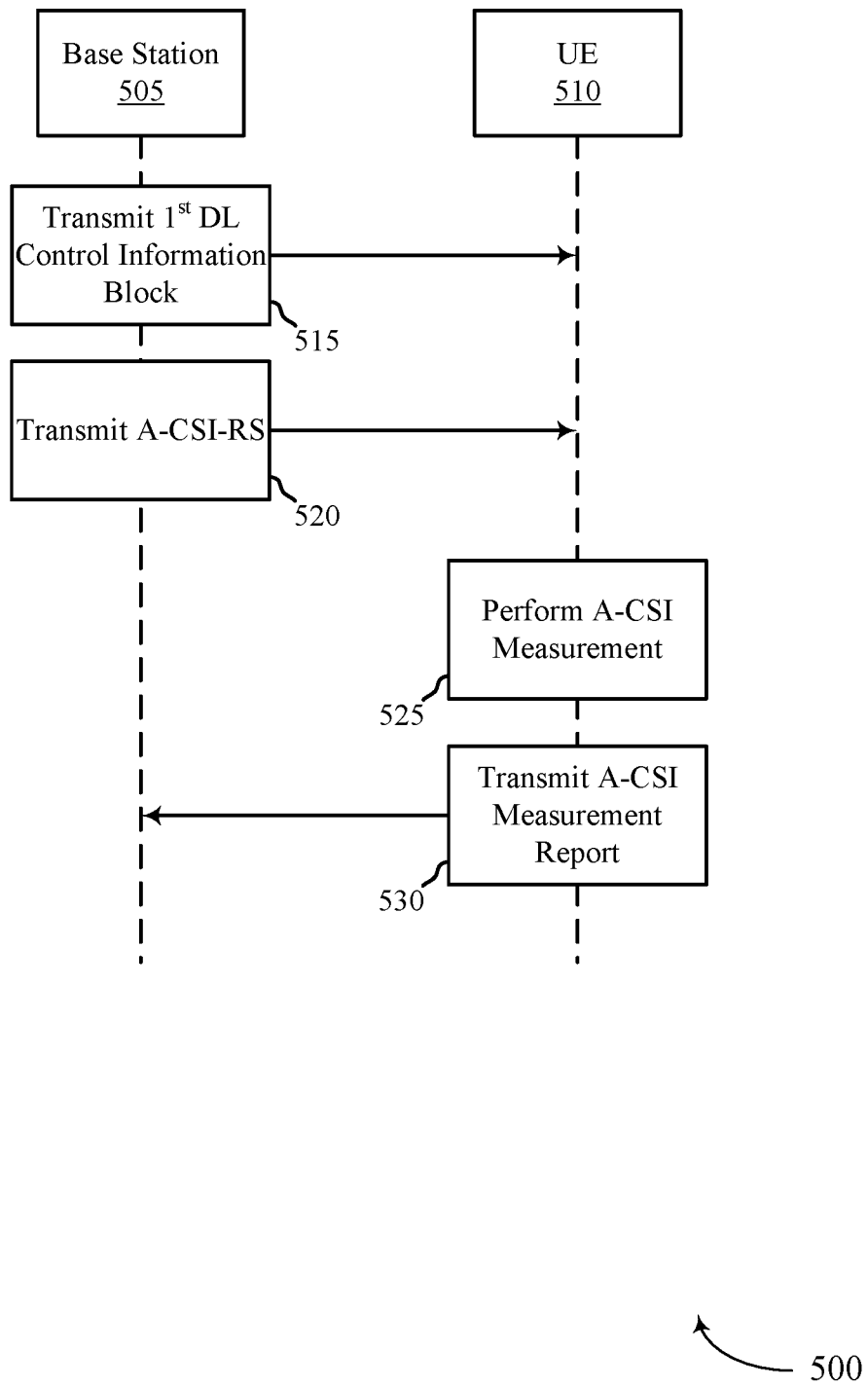
FIG. 5 illustrates an example of a process that supports aperiodic CSI-RS sharing across UEs in accordance with aspects of the present disclosure.

FIG. 5 illustrates an example of a process 500 that supports aperiodic CSI-RS sharing across UEs in accordance with aspects of the present disclosure. In some examples, process 500 may implement aspects of wireless communication system 100, CSI configuration 200, and/or methods 300/400. Process 500 may include a base station 505 and a UE 510, which may be examples of corresponding devices described herein.

At 515, base station 505 may transmit (and UE 510 may receive) a first downlink control information block over a group PDCCH signal, e.g., a GC-PDCCH. In some aspects, the first downlink control information block may carry or otherwise convey an indication identifying one or more UEs for performing aperiodic CSI measurement of an aperiodic CSI-RS. In some aspects, the first downlink control information block may carry or otherwise provide an indication of resources for one or more instances of the aperiodic CSI-RS(s). In some aspects, the first downlink control information block may indicate resources for a plurality of instances of the aperiodic CSI-RS(s). In some aspects, the indication of the CSI-RS resources may include time, frequency, pattern, location, offset timing, and the like, for the aperiodic CSI-RS(s). In some aspects, the indication of the resources may include a timing offset parameter that identifies the time difference (e.g., in terms of absolute or relative time, in terms of slots/mini-slots/etc., and the like) between transmission of the group PDCCH signal and the transmission of the aperiodic CSI-RS(s). In some aspects, UE 510 may be configured to monitor for the group PDCCH based on the group PDCCH configuration information received from base station 505.

At 520, the base station 505 may transmit (and UE 510 may receive) the one or more instances of the aperiodic CSI-RS(s) over the resources indicated in the first downlink control information block. The one or more instances of the aperiodic CSI-RS(s) may be transmitted during a single slot or over multiple slots. The one or more instances of the aperiodic CSI-RS(s) may be transmitted during the same slot as the group PDCCH signal or in a later slot.

At 525, UE 510 may perform an aperiodic CSI measurement of the aperiodic CSI-RS(s). For example, UE 510 may measure the aperiodic CSI-RS(s) to determine a RSRP, a RSRQ, a SNR, a SINR, a throughput level, an error detection level, and the like, for the channel based on the aperiodic CSI-RS(s). In some aspects, UE 510 may perform aperiodic CSI measurements on multiple instances of the aperiodic CSI-RSs.

In some aspects, UE 510 may monitor for the CSI-RS based on the timing offset parameter indicated in the first downlink control information block. In some aspects, the timing offset parameter identifies a timing for transmitting the CSI-RS(s) with respect to the timing of transmitting the group PDCCH signal.

At 530, UE 510 may optionally transmit (and base station 505 may optionally receive) an aperiodic CSI measurement report. In some aspects, the aperiodic CSI measurement report is based on the aperiodic CSI measurement of the aperiodic CSI-RS(s) performed by a UE 510. An example where base station 505 identifies multiple UEs for performing aperiodic CSI measurements in the first downlink control information block, base station 505 may receive multiple aperiodic CSI measurements from the identified UEs.

In some aspects, UE 510 may transmit the aperiodic CSI measurement report in response to a second downlink control information block received from base station 505 that includes a grant. The second downlink control information block may trigger the aperiodic CSI measurement report from UE 510. In some aspects, the second downlink control information block may be communicated later in time than the CSI-RS(s). In some aspects, the second downlink control information block may be communicated at the same time as the CSI-RS(s). In some aspects, UE 510 may transmit the aperiodic CSI measurement report by piggybacking the report onto the resources indicated in the grant. As one example where the grant is an uplink grant, UE 510 may transmit the aperiodic CSI measurement report over PUSCH. As another example where the grant is a downlink grant, UE 510 may transmit the aperiodic CSI measurement report over PUCCH. In some aspects, UE 510 may identify an AUL transmission opportunity and include the aperiodic CSI measurement during the AUL transmission opportunity.

Although not shown in process 500, base station 505 may also transmit third downlink control information block to a different UE (e.g., any UE other than UE 510) that includes a grant for the different UE. The third downlink control information block may be transmitted at the same time or at a different time as the first downlink control information block. The third downlink control information block may also provide an indication of the resources that the different UE is to use to submit an aperiodic CSI-RS measurement report.

Figure 6:
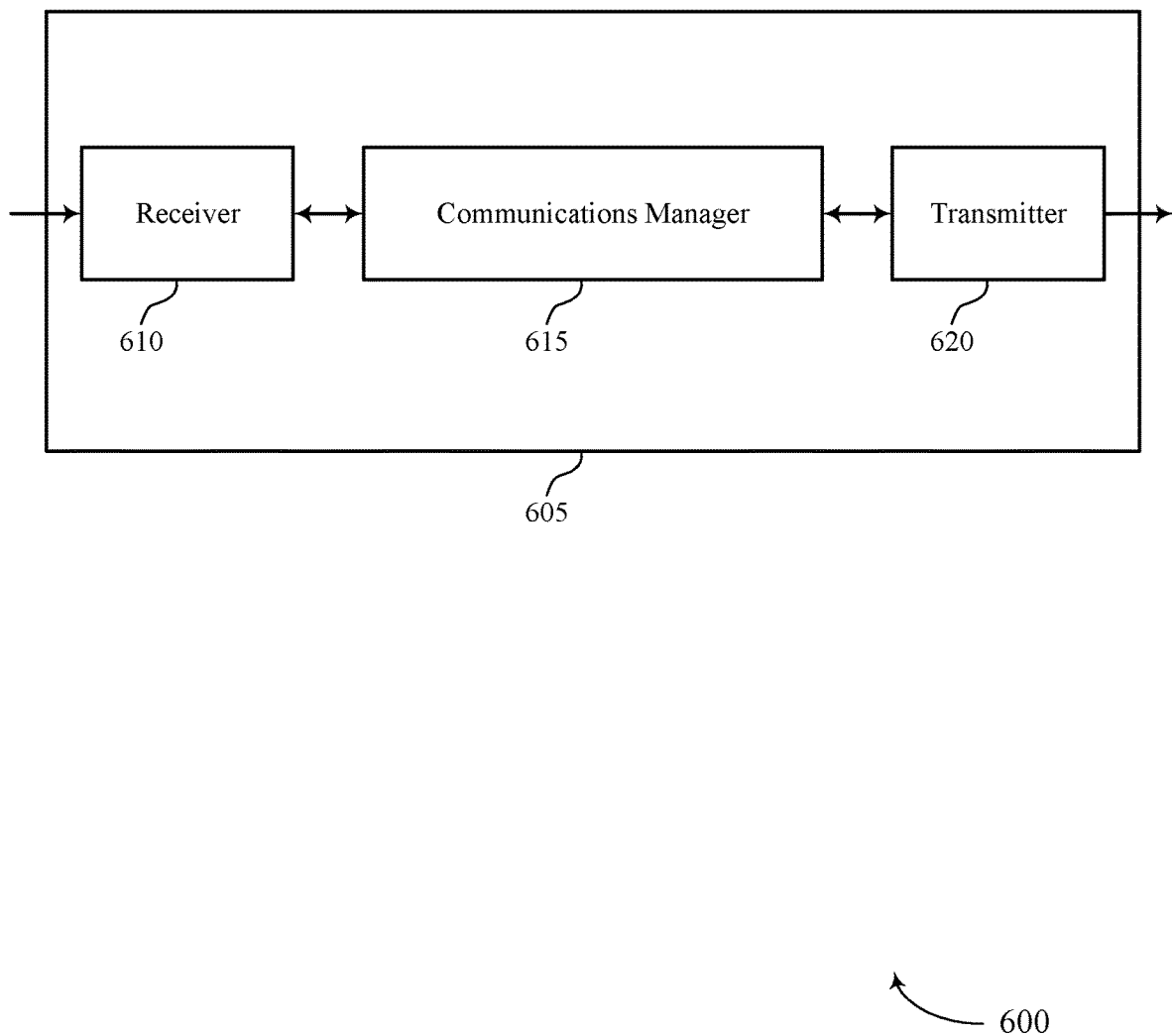
FIGS. 6 and 7 show block diagrams of devices that support aperiodic CSI-RS sharing across UEs in accordance with aspects of the present disclosure.

FIG. 6 shows a block diagram 600 of a device 605 that supports aperiodic CSI-RS sharing across UEs in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to aperiodic CSI-RS sharing across UEs, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive first downlink control information block over a group PDCCH, where the first downlink control information block identifies a set of UEs for performing aperiodic CSI measurements and an indication of CSI reference signal resources for a CSI reference signal, and perform, in response to receiving the group PDCCH, an aperiodic CSI measurement of the CSI reference signal on the indicated CSI reference signal resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
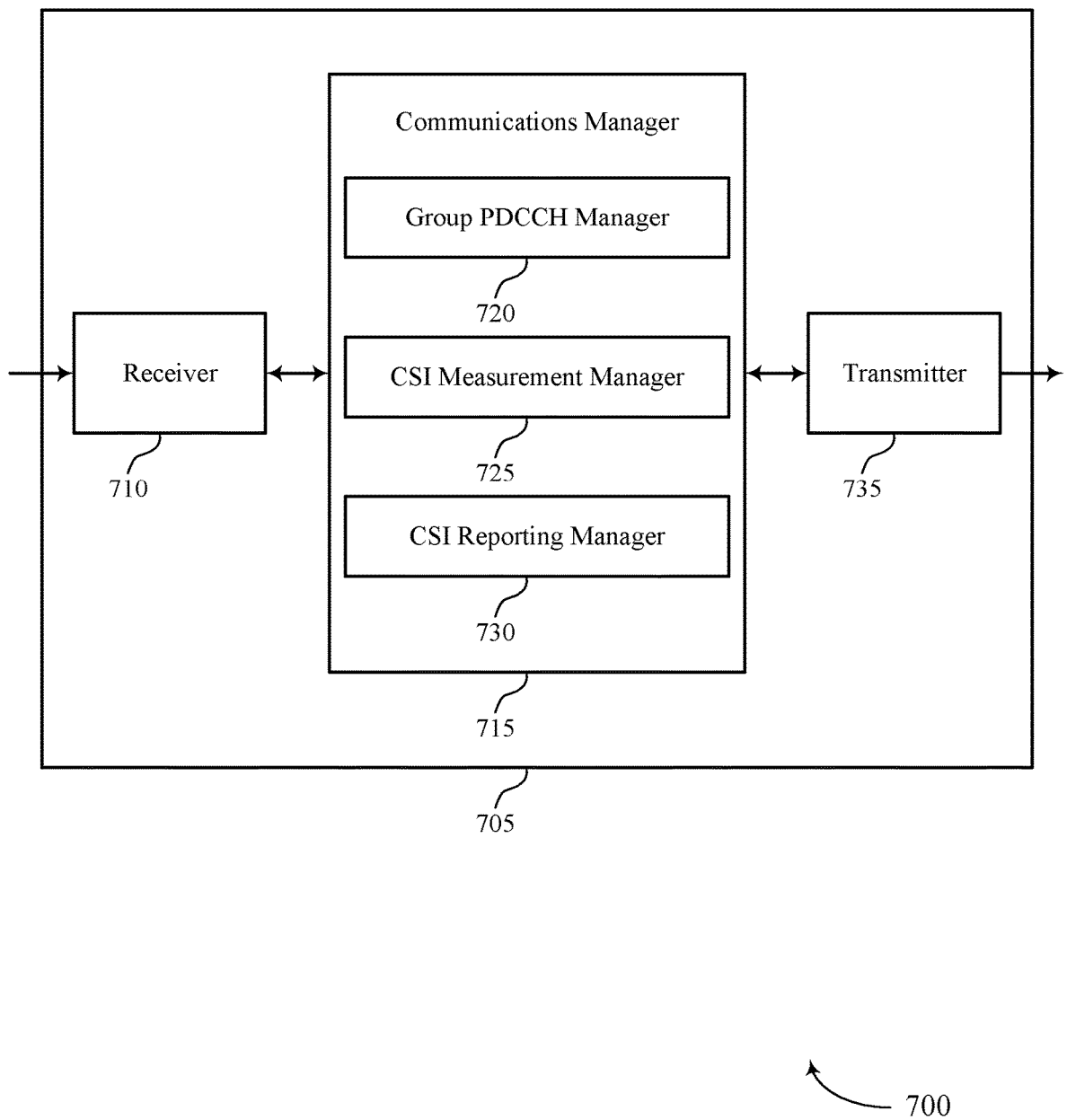

FIG. 7 shows a block diagram 700 of a device 705 that supports aperiodic CSI-RS sharing across UEs in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to aperiodic CSI-RS sharing across UEs, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a group PDCCH manager 720, a CSI measurement manager 725, and a CSI reporting manager 730. The communications manager 715 may be an example of aspects of the communications manager 910 described herein.

The group PDCCH manager 720 may receive first downlink control information block over a group PDCCH, where the first downlink control information block identifies a set of UEs for performing aperiodic CSI measurements and an indication of CSI reference signal resources for a CSI reference signal.

The CSI measurement manager 725 may perform, in response to receiving the group PDCCH, an aperiodic CSI measurement of the CSI reference signal on the indicated CSI reference signal resources.

The CSI reporting manager 730 may transmit the aperiodic CSI measurement of the CSI reference signal based on the group PDCCH.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
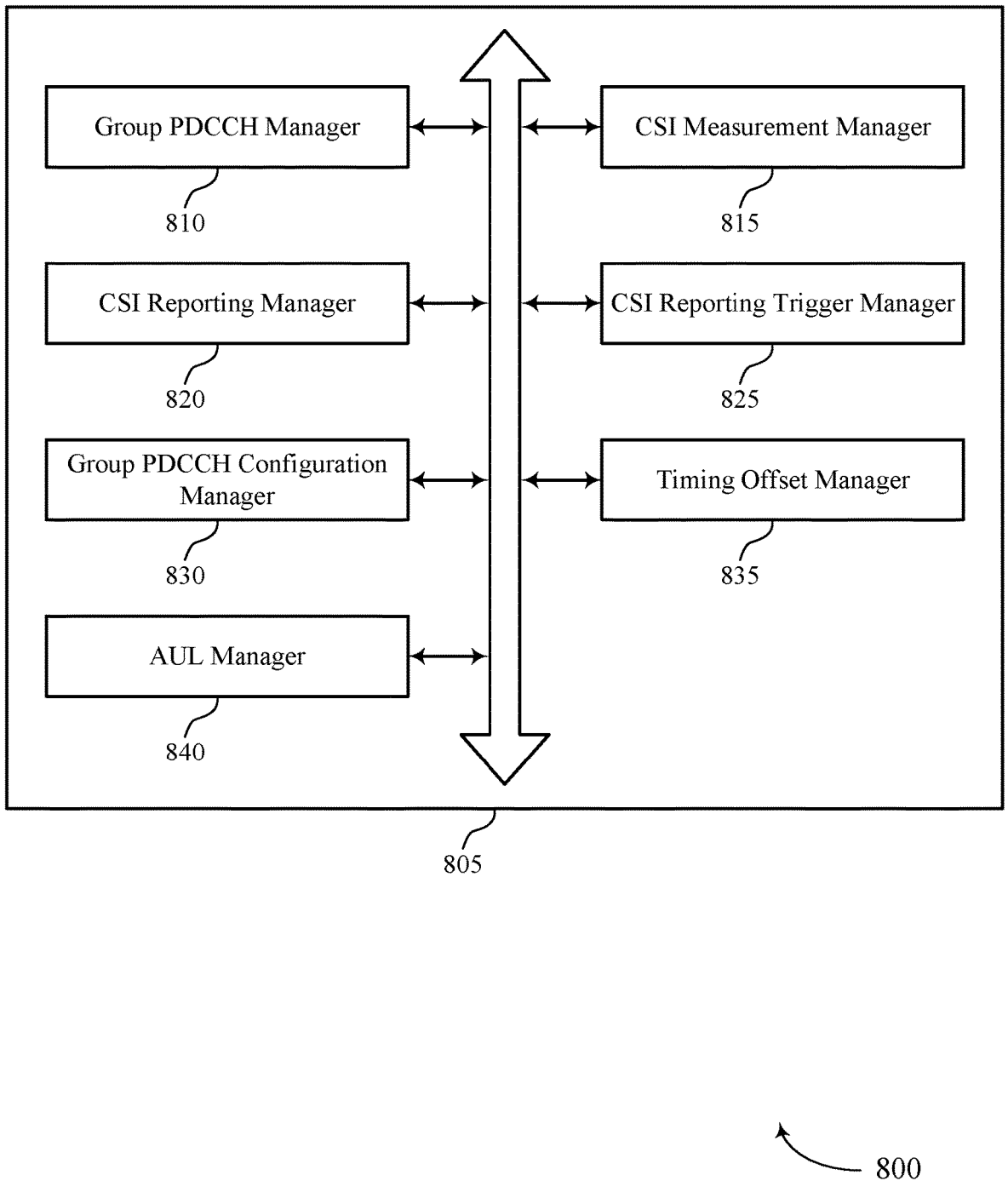
FIG. 8 shows a block diagram of a communications manager that supports aperiodic CSI-RS sharing across UEs in accordance with aspects of the present disclosure.

FIG. 8 shows a block diagram 800 of a communications manager 805 that supports aperiodic CSI-RS sharing across UEs in accordance with aspects of the present disclosure. The communications manager 805 may be an example of aspects of a communications manager 615, a communications manager 715, or a communications manager 910 described herein. The communications manager 805 may include a group PDCCH manager 810, a CSI measurement manager 815, a CSI reporting manager 820, a CSI reporting trigger manager 825, a group PDCCH configuration manager 830, a timing offset manager 835, and an AUL manager 840. Each of these modules may communicate, directly or indirectly, with one another (e.g., via one or more buses).

The group PDCCH manager 810 may receive first downlink control information block over a group PDCCH, where the first downlink control information block identifies a set of UEs for performing aperiodic CSI measurements and an indication of CSI reference signal resources for a CSI reference signal. In some cases, the first downlink control information block indicates CSI reference signal resources for multiple instances of the CSI reference signal. In some cases, the first downlink control information block includes at least one of a timing parameter, or a location parameter, or a combination thereof, for the CSI reference signal resources.

The CSI measurement manager 815 may perform, in response to receiving the group PDCCH, an aperiodic CSI measurement of the CSI reference signal on the indicated CSI reference signal resources.

The CSI reporting manager 820 may transmit the aperiodic CSI measurement of the CSI reference signal based on the group PDCCH.

The CSI reporting trigger manager 825 may receive second downlink control information block including a grant to the UE, where transmitting the aperiodic CSI measurement is based on the grant. In some examples, the CSI reporting trigger manager 825 may receive the second downlink control information block occurs later in time than receiving the CSI reference signal. In some cases, the grant includes an uplink grant and the aperiodic CSI measurement is transmitted over a PUSCH. In some cases, the grant includes a downlink grant and the aperiodic CSI measurement is transmitted over a PUCCH.

The group PDCCH configuration manager 830 may receive a group PDCCH configuration information for monitoring for the CSI reference signal. In some examples, the group PDCCH configuration manager 830 may monitor for the CSI reference signal based on the group PDCCH configuration information.

The timing offset manager 835 may identify, based on the first downlink control information block, a timing offset parameter, where the timing offset parameter identifies a timing for transmitting the CSI reference signal with respect to the timing of transmitting the group PDCCH. In some examples, the timing offset manager 835 may monitor for the CSI reference signal based on the timing offset parameter.

The AUL manager 840 may transmit an AUL transmission that includes the aperiodic CSI measurement.

Figure 9:
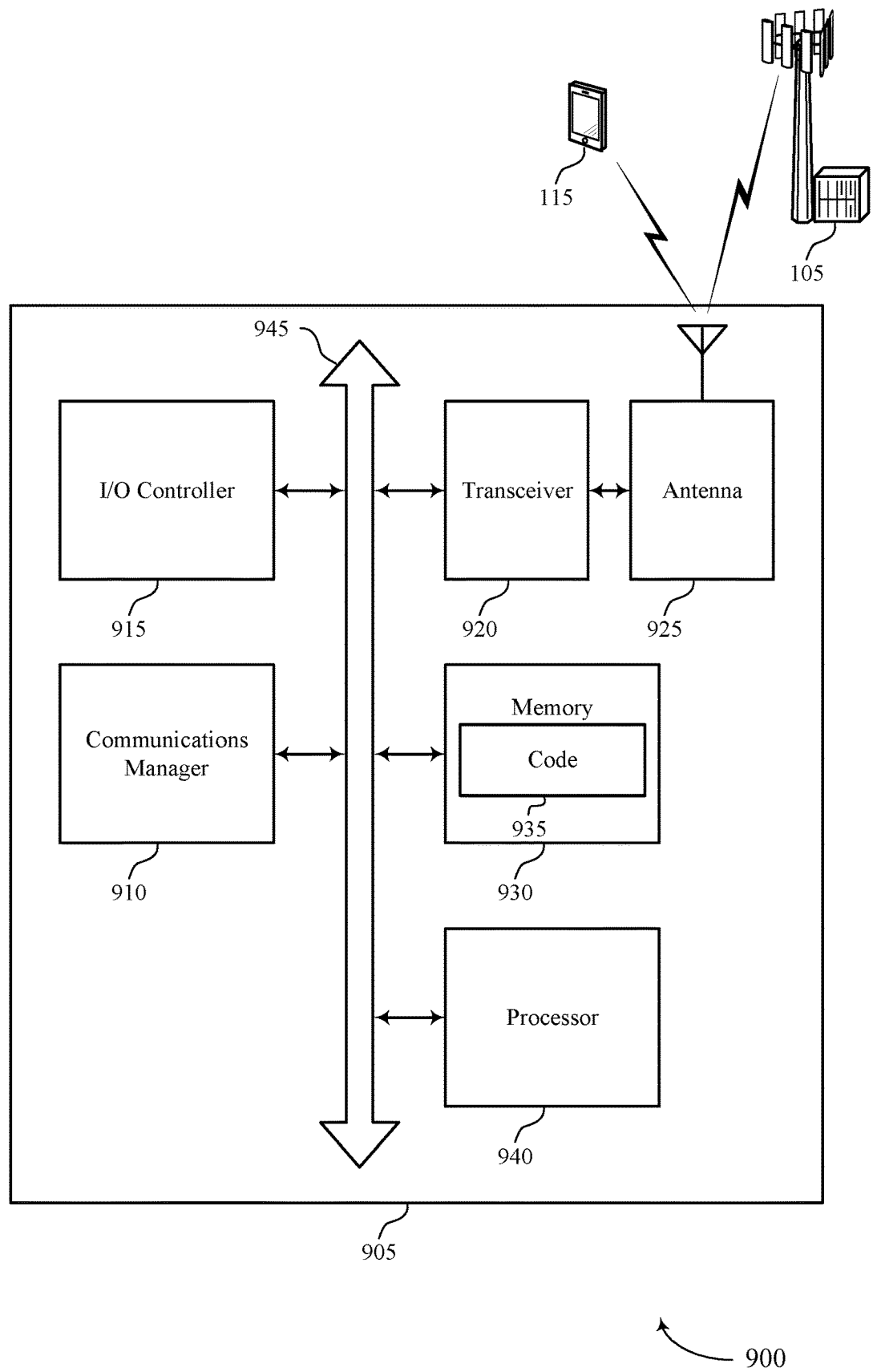
FIG. 9 shows a diagram of a system including a device that supports aperiodic CSI-RS sharing across UEs in accordance with aspects of the present disclosure.

FIG. 9 shows a diagram of a system 900 including a device 905 that supports aperiodic CSI-RS sharing across UEs in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive first downlink control information block over a group PDCCH, where the first downlink control information block identifies a set of UEs for performing aperiodic CSI measurements and an indication of CSI reference signal resources for a CSI reference signal, and perform, in response to receiving the group PDCCH, an aperiodic CSI measurement of the CSI reference signal on the indicated CSI reference signal resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting aperiodic CSI-RS sharing across UEs).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
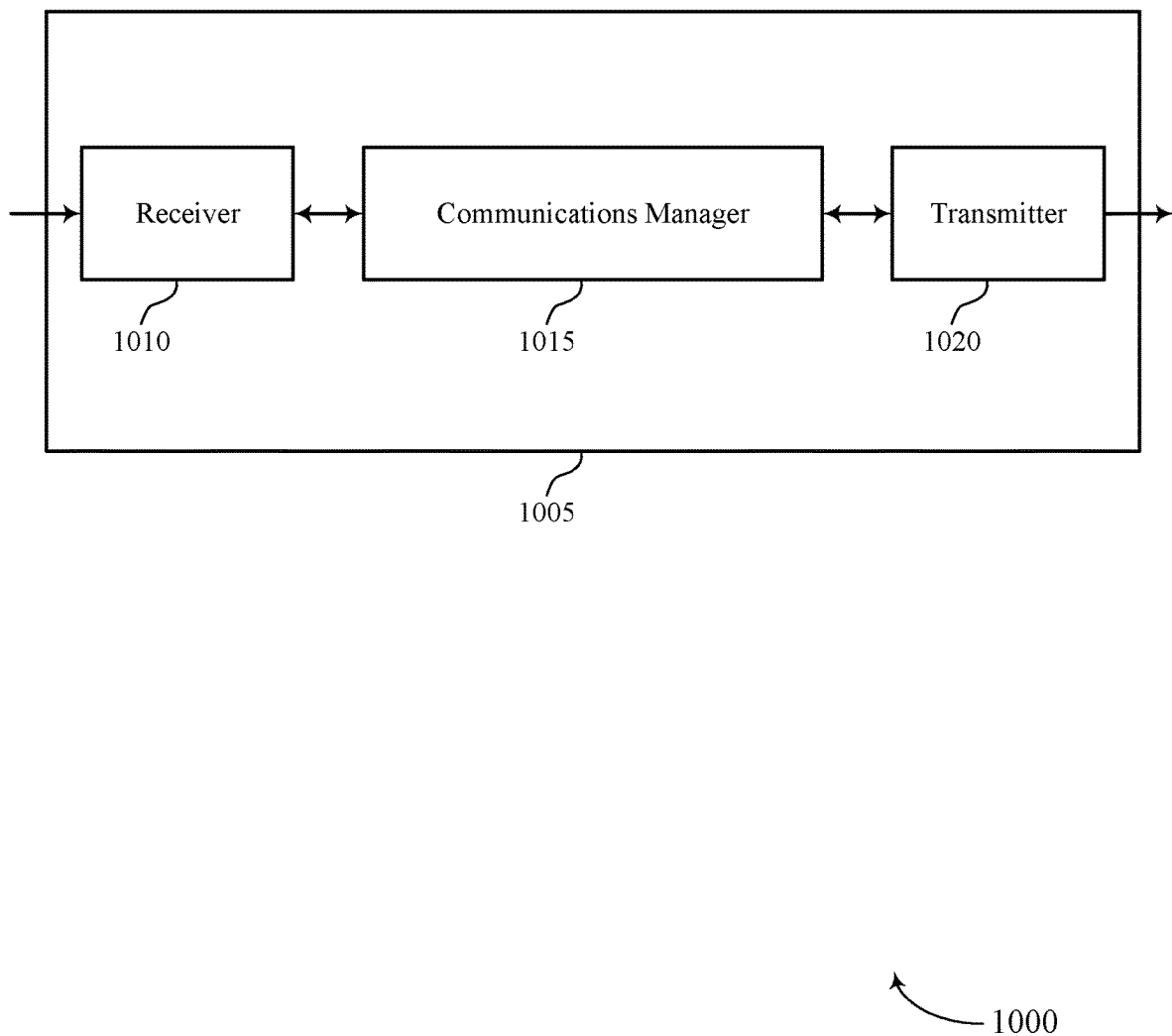
FIGS. 10 and 11 show block diagrams of devices that support aperiodic CSI-RS sharing across UEs in accordance with aspects of the present disclosure.

FIG. 10 shows a block diagram 1000 of a device 1005 that supports aperiodic CSI-RS sharing across UEs in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to aperiodic CSI-RS sharing across UEs, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a first downlink control information block over a group PDCCH, where the first downlink control information block identifies a set of UEs for performing aperiodic CSI measurements and an indication of CSI reference signal resources for a CSI reference signal, and transmit the CSI reference signal on the indicated CSI reference signal resources. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
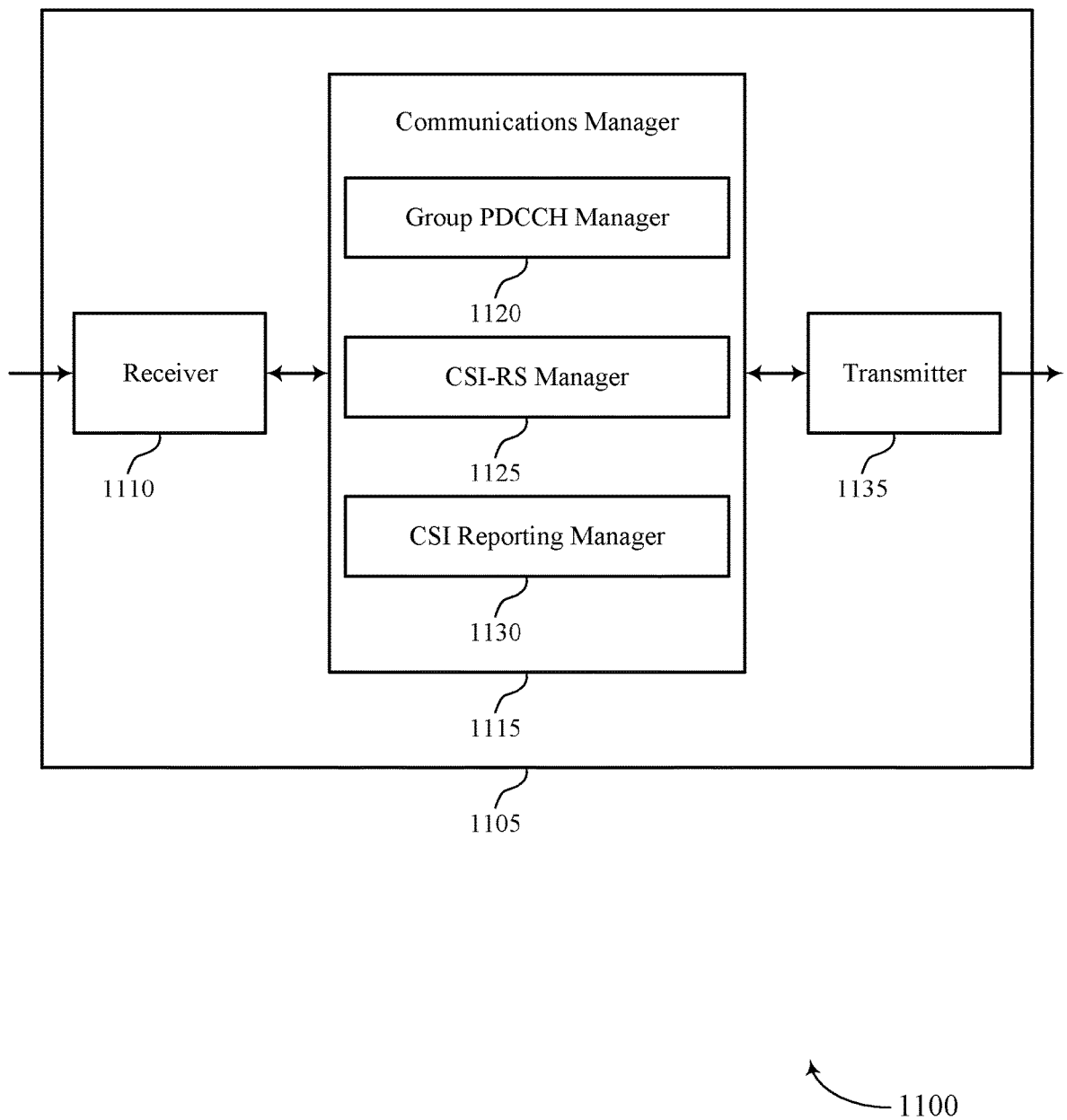

FIG. 11 shows a block diagram 1100 of a device 1105 that supports aperiodic CSI-RS sharing across UEs in accordance with aspects of the present disclosure. The device 1105 may be an example of aspects of a device 1005 or a base station 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to aperiodic CSI-RS sharing across UEs, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a group PDCCH manager 1120, a CSI-RS manager 1125, and a CSI reporting manager 1130. The communications manager 1115 may be an example of aspects of the communications manager 1310 described herein.

The group PDCCH manager 1120 may transmit a first downlink control information block over a group PDCCH, where the first downlink control information block identifies a set of UEs for performing aperiodic CSI measurements and an indication of CSI reference signal resources for a CSI reference signal.

The CSI-RS manager 1125 may transmit the CSI reference signal on the indicated CSI reference signal resources.

The CSI reporting manager 1130 may receive an aperiodic CSI measurement of the CSI reference signal from a UE of the set of UEs based on the group PDCCH.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
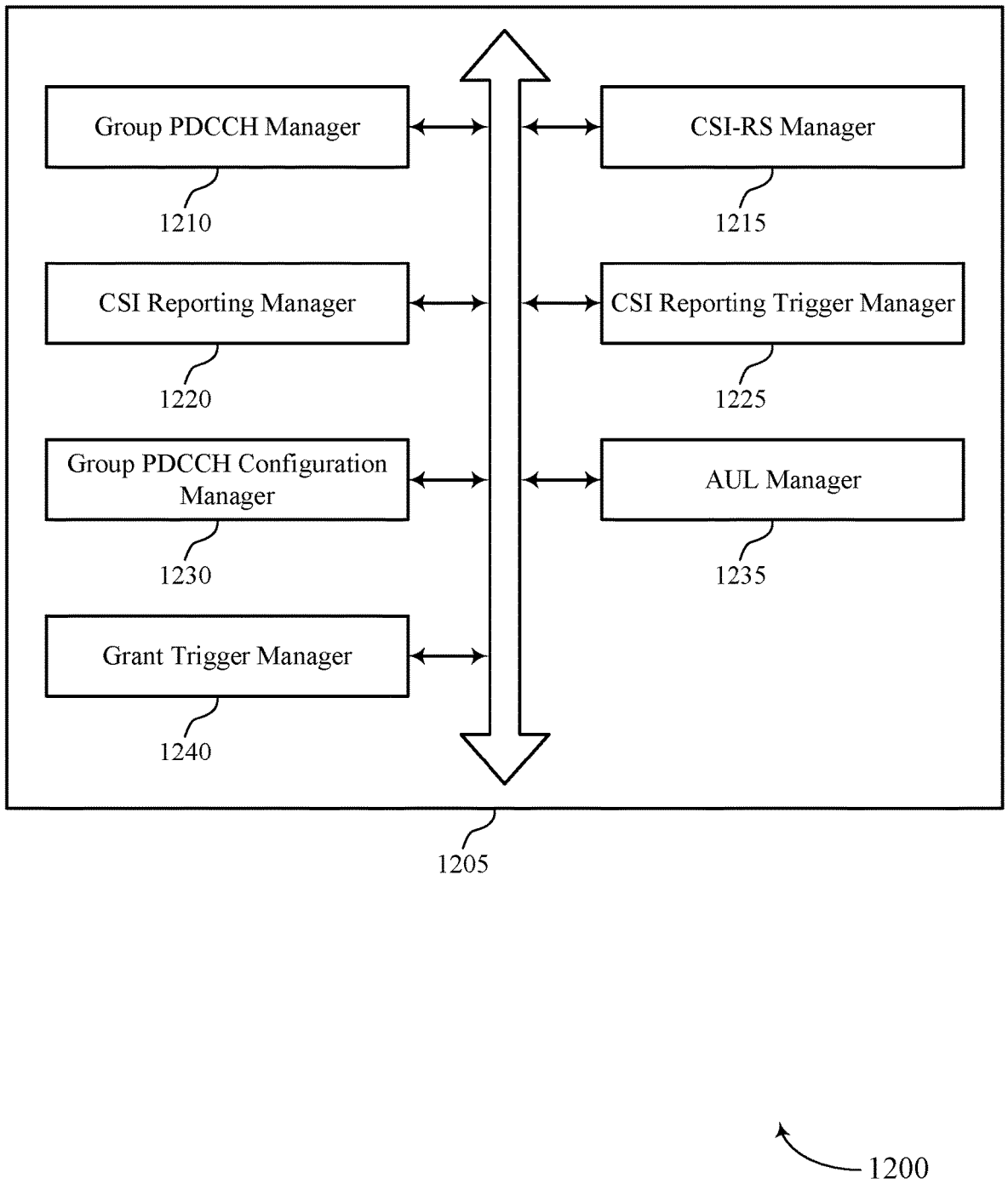
FIG. 12 shows a block diagram of a communications manager that supports aperiodic CSI-RS sharing across UEs in accordance with aspects of the present disclosure.

FIG. 12 shows a block diagram 1200 of a communications manager 1205 that supports aperiodic CSI-RS sharing across UEs in accordance with aspects of the present disclosure. The communications manager 1205 may be an example of aspects of a communications manager 1015, a communications manager 1115, or a communications manager 1310 described herein. The communications manager 1205 may include a group PDCCH manager 1210, a CSI-RS manager 1215, a CSI reporting manager 1220, a CSI reporting trigger manager 1225, a group PDCCH configuration manager 1230, an AUL manager 1235, and a grant trigger manager 1240. Each of these modules may communicate, directly or indirectly, with one another (e.g., via one or more buses).

The group PDCCH manager 1210 may transmit a first downlink control information block over a group PDCCH, where the first downlink control information block identifies a set of UEs for performing aperiodic CSI measurements and an indication of CSI reference signal resources for a CSI reference signal. In some cases, the first downlink control information block indicates CSI reference signal resources for a multiple instances of the CSI reference signal. In some cases, the first downlink control information block includes a timing offset parameter, where the timing offset parameter identifies a timing for transmitting the CSI reference signal with respect to the timing of transmitting the group PDCCH. In some cases, the first downlink control information block includes at least one of a timing parameter, or a location parameter, or a combination thereof, for the CSI reference signal resources. In some cases, the first downlink control information block identifies UEs of the set of UEs that are to perform the aperiodic CSI measurements.

The CSI-RS manager 1215 may transmit the CSI reference signal on the indicated CSI reference signal resources.

The CSI reporting manager 1220 may receive an aperiodic CSI measurement of the CSI reference signal from a UE of the set of UEs based on the group PDCCH. In some examples, the CSI reporting manager 1220 may receive a set of aperiodic CSI measurements of the CSI reference signal from the set of UEs based on the group PDCCH.

The CSI reporting trigger manager 1225 may transmit, to the UE, a second downlink control information block including a grant of resources to the UE, where receiving the aperiodic CSI measurement from the UE is based on the grant. In some examples, the CSI reporting trigger manager 1225 may transmit the second downlink control information block occurs later in time than transmitting the CSI reference signal. In some cases, the grant includes an uplink grant and the aperiodic CSI measurement is received over a PUSCH. In some cases, the grant includes a downlink grant and the aperiodic CSI measurement is received over a PUCCH.

The group PDCCH configuration manager 1230 may transmit to the UE a group PDCCH configuration including information for monitoring the group PDCCH.

The AUL manager 1235 may receive an AUL transmission from the UE, where the AUL transmission includes the aperiodic CSI measurement.

The grant trigger manager 1240 may transmit a third downlink control information block to a second UE of the set of UEs, where the third downlink control information block includes a grant for the second UE. In some examples, the grant trigger manager 1240 may receive a second aperiodic CSI measurement of the CSI reference signal from the second UE based on the grant. In some cases, the third downlink control information block is transmitted in conjunction with the first downlink control information block.

Figure 13:
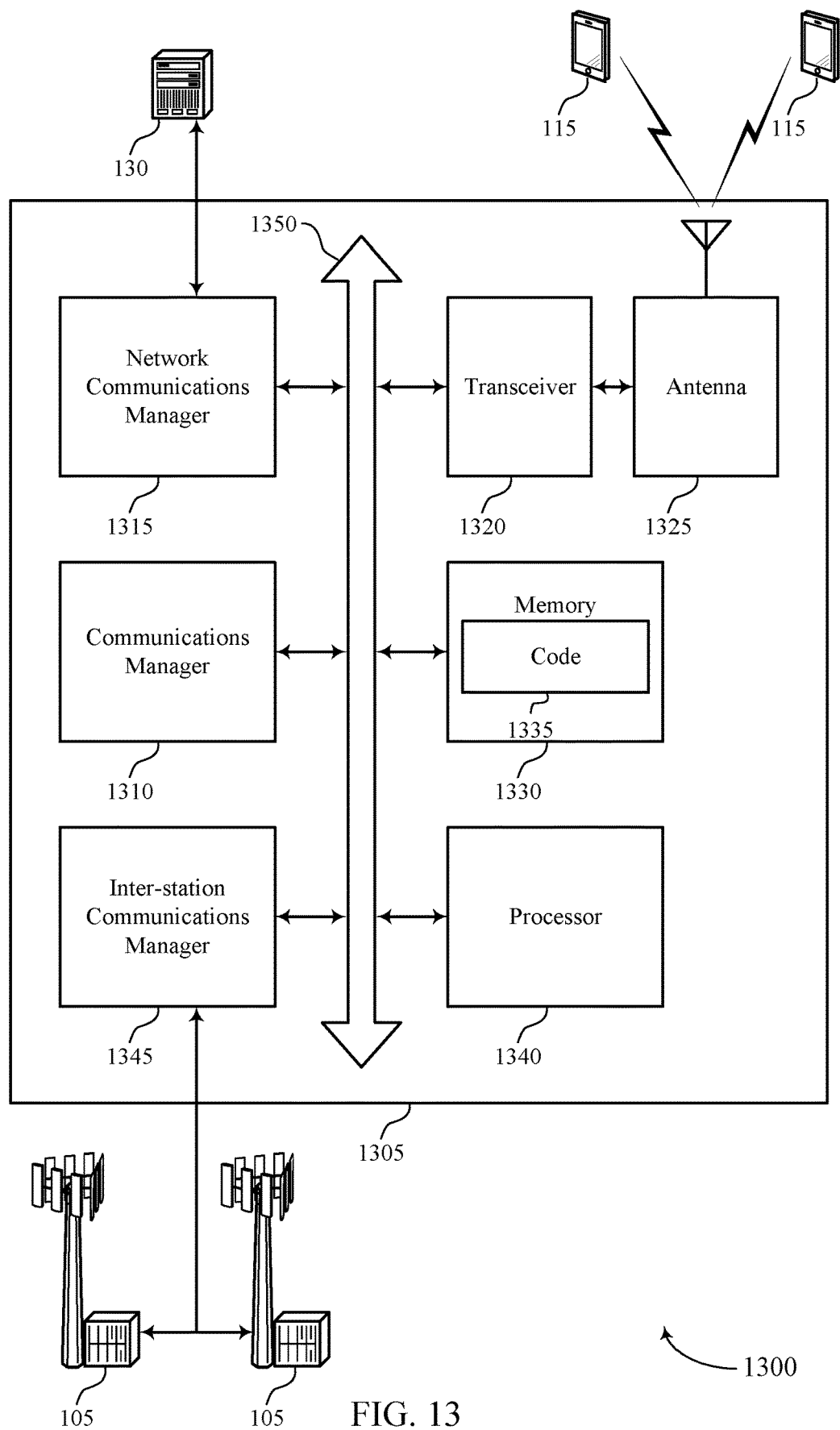
FIG. 13 shows a diagram of a system including a device that supports aperiodic CSI-RS sharing across UEs in accordance with aspects of the present disclosure.

FIG. 13 shows a diagram of a system 1300 including a device 1305 that supports aperiodic CSI-RS sharing across UEs in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a first downlink control information block over a group PDCCH, where the first downlink control information block identifies a set of UEs for performing aperiodic CSI measurements and an indication of CSI reference signal resources for a CSI reference signal, and transmit the CSI reference signal on the indicated CSI reference signal resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device #{device} to perform various functions (e.g., functions or tasks supporting aperiodic CSI-RS sharing across UEs).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
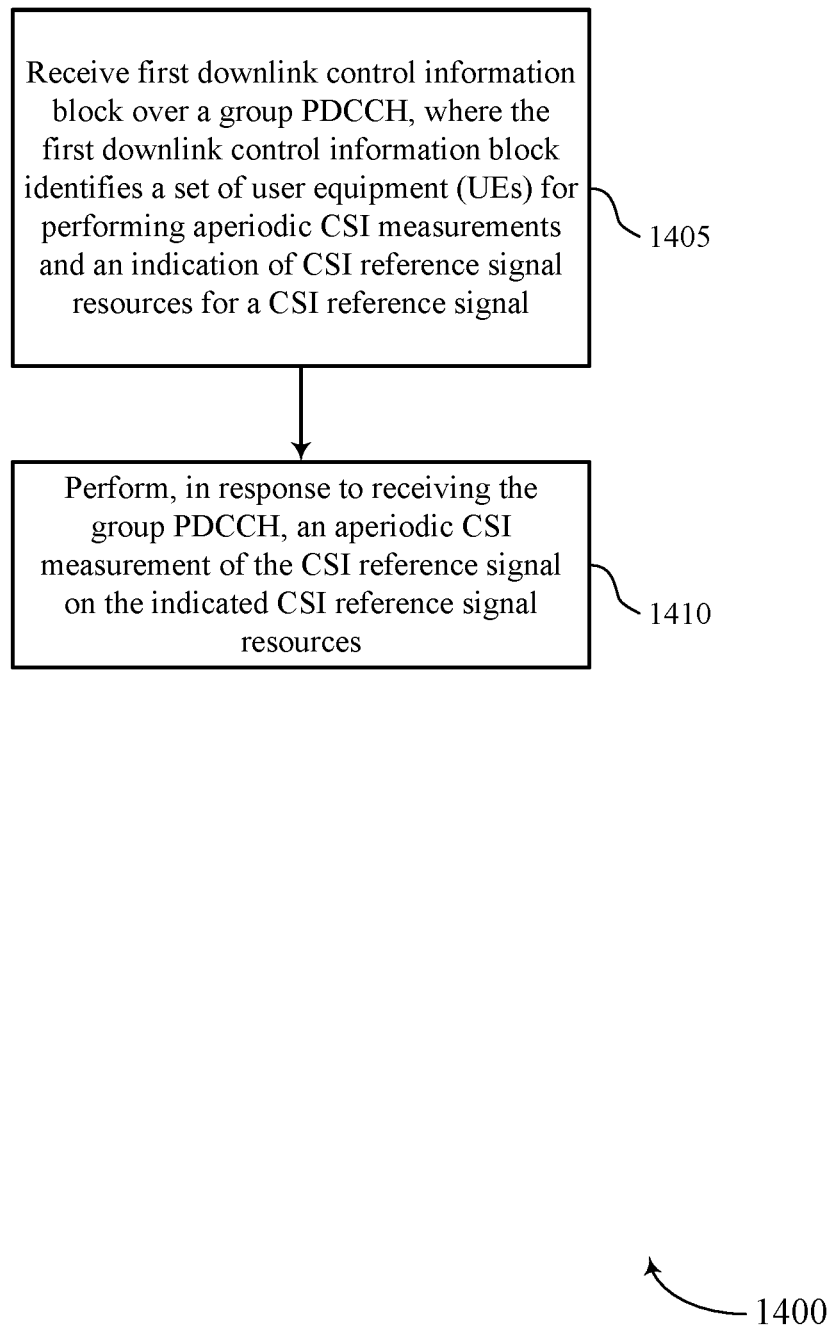
FIGS. 14 through 17 show flowcharts illustrating methods that support aperiodic CSI-RS sharing across UEs in accordance with aspects of the present disclosure.

FIG. 14 shows a flowchart illustrating a method 1400 that supports aperiodic CSI-RS sharing across UEs in accordance with aspects of the present disclosure. The operations of method 1400 may be implemented by a UE 115 or its components as described herein. For example, the operations of method 1400 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1405, the UE may receive first downlink control information block over a group PDCCH, where the first downlink control information block identifies a set of UEs for performing aperiodic CSI measurements and an indication of CSI reference signal resources for a CSI reference signal. The operations of 1405 may be performed according to the methods described herein. In some examples, aspects of the operations of 1405 may be performed by a group PDCCH manager as described with reference to FIGS. 6 through 9.

At 1410, the UE may perform, in response to receiving the group PDCCH, an aperiodic CSI measurement of the CSI reference signal on the indicated CSI reference signal resources. The operations of 1410 may be performed according to the methods described herein. In some examples, aspects of the operations of 1410 may be performed by a CSI measurement manager as described with reference to FIGS. 6 through 9.

Figure 15:
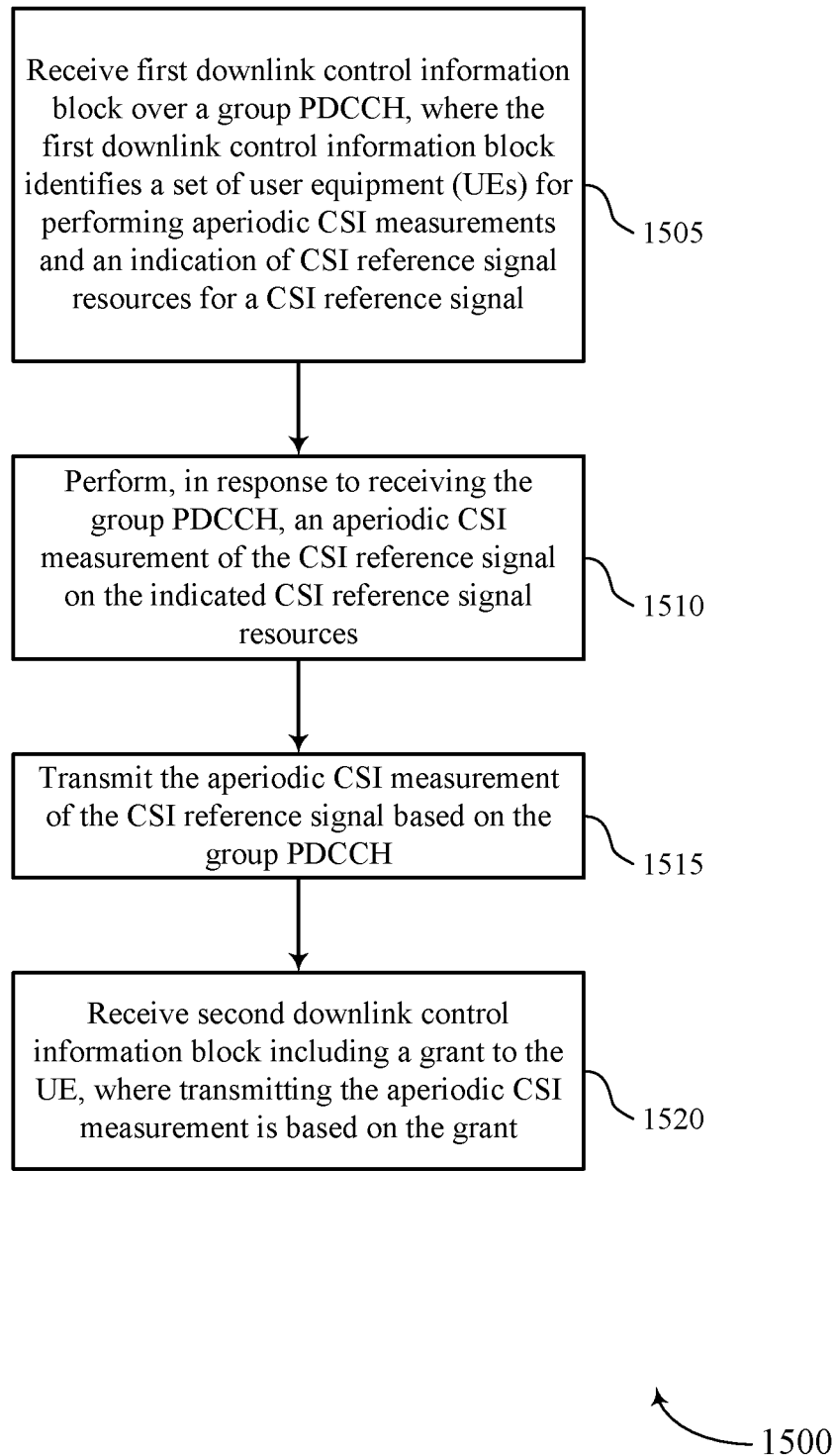

FIG. 15 shows a flowchart illustrating a method 1500 that supports aperiodic CSI-RS sharing across UEs in accordance with aspects of the present disclosure. The operations of method 1500 may be implemented by a UE 115 or its components as described herein. For example, the operations of method 1500 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1505, the UE may receive first downlink control information block over a group PDCCH, where the first downlink control information block identifies a set of UEs for performing aperiodic CSI measurements and an indication of CSI reference signal resources for a CSI reference signal. The operations of 1505 may be performed according to the methods described herein. In some examples, aspects of the operations of 1505 may be performed by a group PDCCH manager as described with reference to FIGS. 6 through 9.

At 1510, the UE may perform, in response to receiving the group PDCCH, an aperiodic CSI measurement of the CSI reference signal on the indicated CSI reference signal resources. The operations of 1510 may be performed according to the methods described herein. In some examples, aspects of the operations of 1510 may be performed by a CSI measurement manager as described with reference to FIGS. 6 through 9.

At 1515, the UE may transmit the aperiodic CSI measurement of the CSI reference signal based on the group PDCCH. The operations of 1515 may be performed according to the methods described herein. In some examples, aspects of the operations of 1515 may be performed by a CSI reporting manager as described with reference to FIGS. 6 through 9.

At 1520, the UE may receive second downlink control information block including a grant to the UE, where transmitting the aperiodic CSI measurement is based on the grant. The operations of 1520 may be performed according to the methods described herein. In some examples, aspects of the operations of 1520 may be performed by a CSI reporting trigger manager as described with reference to FIGS. 6 through 9.

Figure 16:
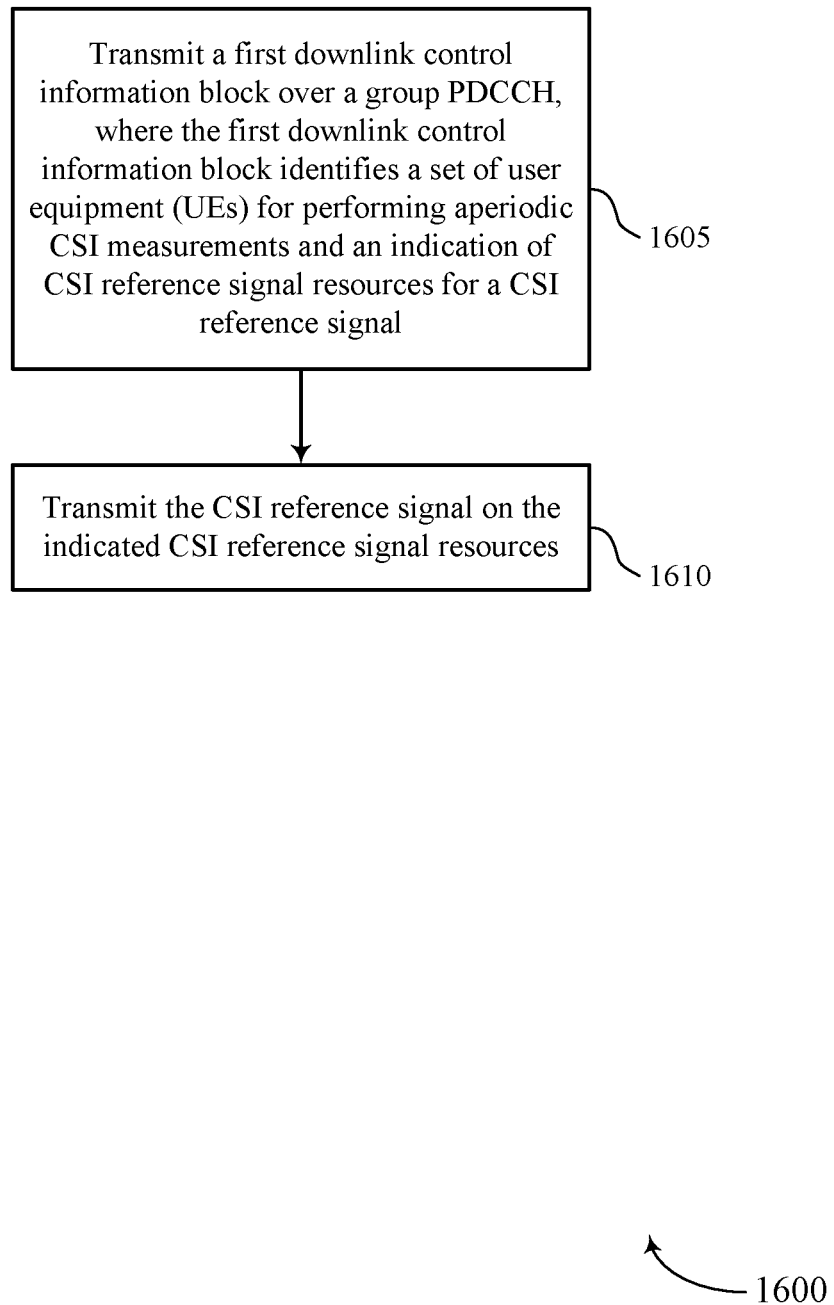

FIG. 16 shows a flowchart illustrating a method 1600 that supports aperiodic CSI-RS sharing across UEs in accordance with aspects of the present disclosure. The operations of method 1600 may be implemented by a base station 105 or its components as described herein. For example, the operations of method 1600 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 1605, the base station may transmit a first downlink control information block over a group PDCCH, where the first downlink control information block identifies a set of UEs for performing aperiodic CSI measurements and an indication of CSI reference signal resources for a CSI reference signal. The operations of 1605 may be performed according to the methods described herein. In some examples, aspects of the operations of 1605 may be performed by a group PDCCH manager as described with reference to FIGS. 10 through 13.

At 1610, the base station may transmit the CSI reference signal on the indicated CSI reference signal resources. The operations of 1610 may be performed according to the methods described herein. In some examples, aspects of the operations of 1610 may be performed by a CSI-RS manager as described with reference to FIGS. 10 through 13.

Figure 17:
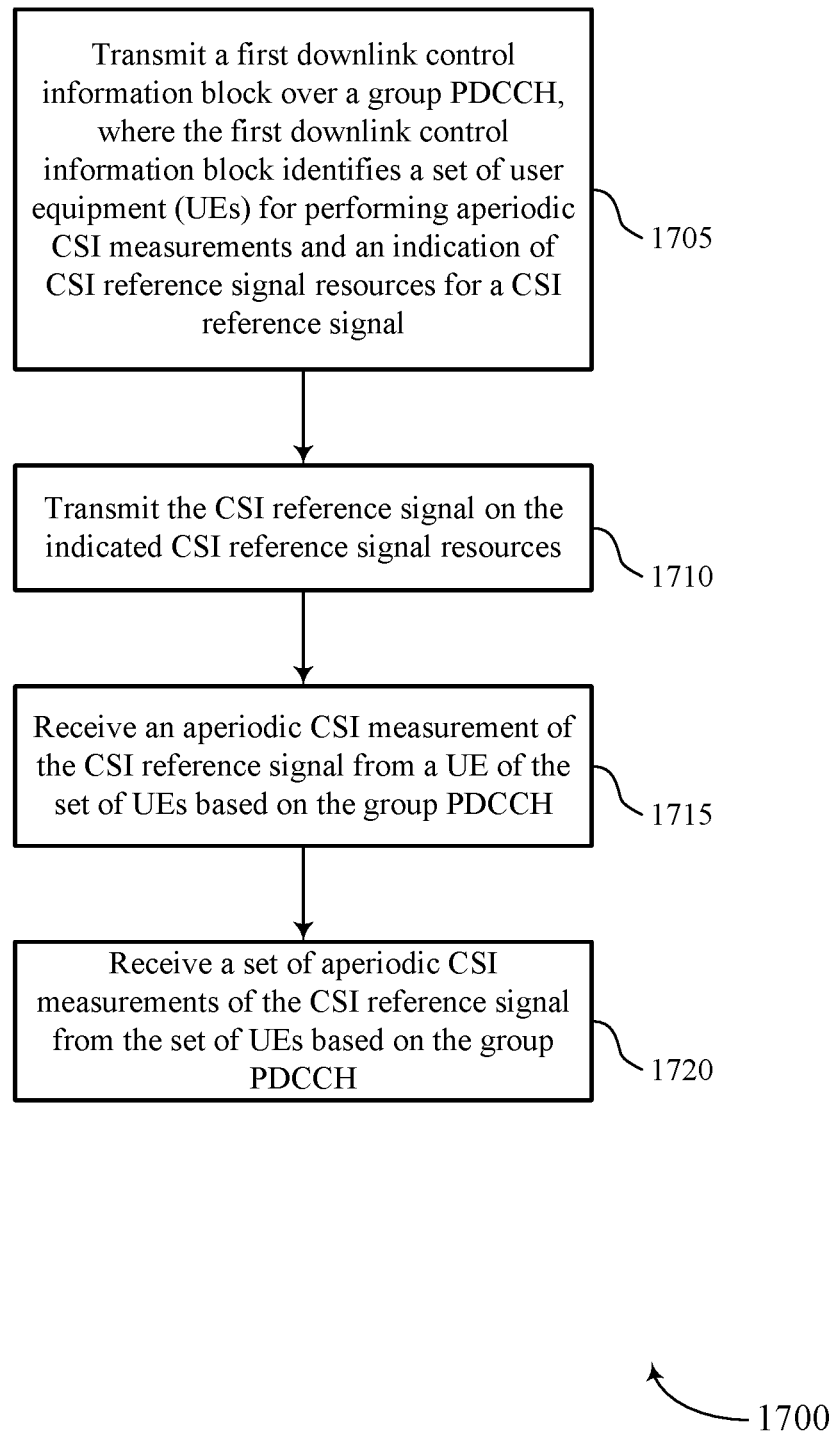

FIG. 17 shows a flowchart illustrating a method 1700 that supports aperiodic CSI-RS sharing across UEs in accordance with aspects of the present disclosure. The operations of method 1700 may be implemented by a base station 105 or its components as described herein. For example, the operations of method 1700 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 1705, the base station may transmit a first downlink control information block over a group PDCCH, where the first downlink control information block identifies a set of UEs for performing aperiodic CSI measurements and an indication of CSI reference signal resources for a CSI reference signal. The operations of 1705 may be performed according to the methods described herein. In some examples, aspects of the operations of 1705 may be performed by a group PDCCH manager as described with reference to FIGS. 10 through 13.

At 1710, the base station may transmit the CSI reference signal on the indicated CSI reference signal resources. The operations of 1710 may be performed according to the methods described herein. In some examples, aspects of the operations of 1710 may be performed by a CSI-RS manager as described with reference to FIGS. 10 through 13.

At 1715, the base station may receive an aperiodic CSI measurement of the CSI reference signal from a UE of the set of UEs based on the group PDCCH. The operations of 1715 may be performed according to the methods described herein. In some examples, aspects of the operations of 1715 may be performed by a CSI reporting manager as described with reference to FIGS. 10 through 13.

At 1720, the base station may receive a set of aperiodic CSI measurements of the CSI reference signal from the set of UEs based on the group PDCCH. The operations of 1720 may be performed according to the methods described herein. In some examples, aspects of the operations of 1720 may be performed by a CSI reporting manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving, via a group physical downlink control channel (PDCCH), a first downlink control information block that triggers measurement of a channel state information (CSI) reference signal, wherein the first downlink control information block indicates a plurality of UEs for performing aperiodic CSI measurements and comprises an indication of both aperiodic CSI reference signal resources for the CSI reference signal and a timing offset parameter for the CSI reference signal, wherein the plurality of UEs comprises the UE, and wherein the timing offset parameter indicates a time difference between the first downlink control information block and of the CSI reference signal;

monitoring the aperiodic CSI reference signal resources for the CSI reference signal based at least in part on receiving the first downlink control information block and on the timing offset parameter;

performing, in response to receiving the first downlink control information block and based at least in part on the monitoring, an aperiodic CSI measurement of the CSI reference signal, wherein the first downlink control information block does not trigger transmission of a CSI report associated with the aperiodic CSI measurement; and receiving, after performing the aperiodic CSI measurement and based at least in part on receiving the first downlink control information block that triggers measurement of the CSI reference signal, a second downlink control information block that triggers reporting of the aperiodic CSI measurement, wherein the second downlink control information block is different from the first downlink control information block, is associated with the UE, and is not associated with other UEs of the plurality of UEs.

2. The method of claim 1, further comprising:
receiving the second downlink control information block comprising a grant to the UE; and
transmitting the aperiodic CSI measurement of the CSI reference signal based at least in part on the grant.

3. The method of claim 2, wherein the grant comprises an uplink grant and the aperiodic CSI measurement is transmitted via a physical uplink shared channel (PUSCH).

4. The method of claim 2, wherein the grant comprises a downlink grant and the aperiodic CSI measurement is transmitted via a physical uplink control channel (PUCCH).

5. The method of claim 2, wherein receiving the second downlink control information block occurs later in time than receiving the CSI reference signal.

6. The method of claim 1, further comprising:
receiving a group PDCCH configuration information for monitoring for the CSI reference signal; and
monitoring the aperiodic CSI reference signal resources for the CSI reference signal based at least in part on the group PDCCH configuration information.

7. The method of claim 1, further comprising:
transmitting an autonomous uplink (AUL) transmission that comprises the aperiodic CSI measurement of the CSI reference signal.

8. The method of claim 1, wherein the first downlink control information block indicates additional aperiodic CSI reference signal resources for multiple instances of the CSI reference signal.

9. The method of claim 1, wherein the first downlink control information block comprises at least one of a timing parameter, or a location parameter, or a combination thereof, for the aperiodic CSI reference signal resources.

10. A method for wireless communication at a network device, comprising:
transmitting, via a group physical downlink control channel (PDCCH), a first downlink control information block that triggers measurement of a channel state information (CSI) reference signal, wherein the first downlink control information block indicates a plurality of UEs for performing aperiodic CSI measurements and comprises an indication of both aperiodic CSI reference signal resources for the CSI reference signal and a timing offset parameter for the CSI reference signal, wherein the timing offset parameter indicates a time difference between the first downlink control information block and the CSI reference signal;
transmitting the CSI reference signal on the aperiodic CSI reference signal resources, wherein the first downlink control information block does not trigger transmission of a CSI report associated with an aperiodic CSI measurement; and
transmitting, after transmitting the CSI reference signal and based at least in part on transmitting the first downlink control information block that triggers measurement of the CSI reference signal, a second downlink control information block that triggers reporting of the aperiodic CSI measurement, wherein the second downlink control information block is different from the first downlink control information block, is associated with a UE of the plurality of UEs, and is not associated with other UEs of the plurality of UEs.

11. The method of claim 10, further comprising:
transmitting, to the UE, the second downlink control information block comprising a grant of resources to the UE; and
receiving the aperiodic CSI measurement of the CSI reference signal from the UE based at least in part on the grant.

12. The method of claim 11, wherein the grant comprises an uplink grant and the aperiodic CSI measurement is received via a physical uplink shared channel (PUSCH).

13. The method of claim 11, wherein the grant comprises a downlink grant and the aperiodic CSI measurement is received via a physical uplink control channel (PUCCH).

14. The method of claim 11, wherein transmitting the second downlink control information block occurs later in time than transmitting the CSI reference signal.

15. The method of claim 10, further comprising:
transmitting, to each UE of the plurality of UEs, a respective second downlink control information block comprising a respective UE-specific grant of resources to the each UE; and
receiving a plurality of aperiodic CSI measurements of the CSI reference signal from the plurality of UEs based at least in part on the respective UE-specific grant.

16. The method of claim 10, further comprising:
transmitting to the UE a group PDCCH configuration comprising information for monitoring the group PDCCH.

17. The method of claim 10, wherein the first downlink control information block indicates additional aperiodic CSI reference signal resources for multiple instances of the CSI reference signal.

18. The method of claim 10, further comprising:
receiving an autonomous uplink (AUL) transmission from the UE, wherein the AUL transmission comprises the aperiodic CSI measurement of the CSI reference signal.

19. The method of claim 10, further comprising:
transmitting a third downlink control information block to a second UE of the plurality of UEs, wherein the third downlink control information block comprises a grant for the second UE; and
receiving a second aperiodic CSI measurement of the CSI reference signal from the second UE based at least in part on the grant.

20. The method of claim 19, wherein the third downlink control information block is transmitted in conjunction with the first downlink control information block.

21. The method of claim 10, wherein the first downlink control information block comprises at least one of a timing parameter, or a location parameter, or a combination thereof, for the aperiodic CSI reference signal resources.

22. The method of claim 10, wherein the first downlink control information block indicates UEs of the plurality of UEs that are to perform the aperiodic CSI measurements.

23. An apparatus for wireless communication at a user equipment (UE), comprising:
a processor, memory coupled with the processor; and
instructions stored in the memory and executable by the processor to cause the apparatus to:
receive, via a group physical downlink control channel (PDCCH), a first downlink control information block that triggers measurement of a channel state information (CSI) reference signal, wherein the first downlink control information block indicates a plurality of UEs for performing aperiodic CSI measurements and comprises an indication of both aperiodic CSI reference signal resources for the CSI reference signal and a timing offset parameter for the CSI reference signal, wherein the plurality of UEs comprises the UE, and wherein the timing offset parameter indicates a time difference between the first downlink control information block and the CSI reference signal;

monitor the aperiodic CSI reference signal resources for the CSI reference signal based at least in part on receiving the first downlink control information block and on the timing offset parameter;

perform, in response to receiving the first downlink control information block and based at least in part on the monitoring, an aperiodic CSI measurement of the CSI reference signal, wherein the first downlink control information block does not trigger transmission of a CSI report associated with the aperiodic CSI measurement; and receive, after performing the aperiodic CSI measurement and based at least in part on receiving the first downlink control information block that triggers measurement of the CSI reference signal, a second downlink control information block that triggers reporting of the aperiodic CSI measurement, wherein the second downlink control information block is different from the first downlink control information block, is associated with the UE, and is not associated with other UEs of the plurality of UEs.

24. The apparatus of claim 23, wherein the instructions are further executable by the processor to cause the apparatus to:

receive the second downlink control information block comprising a grant to the UE, wherein transmitting the aperiodic CSI measurement is based at least in part on the grant and transmit the aperiodic CSI measurement of the CSI reference signal based at least in part on the grant.

25. The apparatus of claim 24, wherein the grant comprises an uplink grant and the aperiodic CSI measurement is transmitted via a physical uplink shared channel (PUSCH).

26. An apparatus for wireless communication at a network device, comprising:

a processor, memory coupled with the processor; and instructions stored in the memory and executable by the processor to cause the apparatus to:

transmit, via a group physical downlink control channel (PDCCH), a first downlink control information block that triggers measurement of a channel state information (CSI) reference signal, wherein the first downlink control information block indicates a plurality of UEs for performing aperiodic CSI measurements and comprises an indication of both aperiodic CSI reference signal resources for the CSI reference signal and a timing offset parameter for the CSI reference signal, wherein the timing offset parameter indicates a time difference between the first downlink control information block and the CSI reference signal;

transmit the CSI reference signal on the aperiodic CSI reference signal resources, wherein the first downlink control information block does not trigger transmission of a CSI report associated with an aperiodic CSI measurement; and transmit, after transmitting the CSI reference signal and based at least in part on transmitting the first downlink control information block that triggers measurement of the CSI reference signal, a second downlink control information block that triggers reporting of the aperiodic CSI measurement, wherein the second downlink control information block is different from the first downlink control information block, is associated with a UE of the plurality of UEs, and is not associated with other UEs of the plurality of UEs.

27. The apparatus of claim 26, wherein the instructions are further executable by the processor to cause the apparatus to:

transmit, to the UE, the second downlink control information block comprising a grant of resources to the UE; and receive the aperiodic CSI measurement of the CSI reference signal from the UE based at least in part on the grant.

28. The apparatus of claim 27, wherein the grant comprises an uplink grant and the aperiodic CSI measurement is received via a physical uplink shared channel (PUSCH).

* * * * *